US005615326A

United States Patent [19]

Orton et al.

[11] Patent Number: 5,615,326

[45] Date of Patent: Mar. 25, 1997

[54] OBJECT-ORIENTED VIEWING FRAMEWORK HAVING VIEW GROUPING

[75] Inventors: Debra L. Orton; Eric M. Berdahl, both of San Jose, Calif.

[73] Assignee: Taligent, Inc., Cupertino, Calif.

[21] Appl. No.: 175,910

[22] Filed: Dec. 30, 1993

[51] Int. Cl.[6] .............. G06F 3/14

[52] U.S. Cl. .............. 395/356; 395/326

[58] Field of Search .............. 395/158, 155, 395/159, 161, 164, 650, 157, 700, 800

[56] References Cited

U.S. PATENT DOCUMENTS

| | | | |
|---|---|---|---|
| 4,821,220 | 4/1989 | Duisberg | 264/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. . | |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,315,703 | 5/1994 | Matheny et al. | 395/164 |
| 5,339,392 | 8/1994 | Risberg et al. | 395/161 |
| 5,367,633 | 11/1994 | Matheny et al. | 395/164 |
| 5,369,749 | 11/1994 | Baker et al. | 395/700 |
| 5,388,264 | 2/1995 | Tobias, II et al. | 395/650 |
| 5,404,442 | 4/1995 | Foster et al. | 395/159 |

FOREIGN PATENT DOCUMENTS

| | | |
|---|---|---|
| 0413484 | 2/1991 | European Pat. Off. . |
| 0415573 | 3/1991 | European Pat. Off. . |

*Primary Examiner*—Mark R. Powell
*Assistant Examiner*—Ruay Lian Ho
*Attorney, Agent, or Firm*—Keith Stephens Bookstein & Kudirka

[57] ABSTRACT

A view system provides an extensible mechanism for associating a logical set of windows and manipulating them as a unit. For example, operations can be applied across address spaces to all the members of the group. A group is constructed by inserting a reference to each view in the group in a layer object. The layer object, in turn, can be inserted into a data hierarchy structure in a hierarchy object. The data hierarchy structure defines front to back display levels on a display and defines which windows overlap. Since all the members of the group are in the same layer object, they move to different levels as a group. Polymorphism and extensibility are provided via the object-oriented architecture of the operating system.

7 Claims, 23 Drawing Sheets

OBJECT-ORIENTED VIEWING FRAMEWORK HAVING VIEW GROUPING

COPYRIGHT NOTIFICATION

Portions of this patent application contain materials that are subject to copyright protection. The copyright owner has no objection to the facsimile reproduction by anyone of the patent document, or the patent disclosure, as appears in the Patent and Trademark Office.

CROSS REFERENCE TO RELATED PATENT APPLICATIONS

This patent application is related to the patent application entitled Object Oriented Area System, Ser. No. 08/113,442, now U.S. Pat. No. 5,428,744, entitled Object-Oriented System for Building a Graphic image on a Display by Richard Daniel Webb et al. filed Jun. 20, 1993, and assigned to Taligent, the disclosure of which is hereby incorporated by reference. This application is related to U.S. patent application Ser. No. 08/161,894, entitled Object-Oriented Display System.

FIELD OF THE INVENTION

This invention generally relates to improvements in computer systems and, more particularly, to operating system software for managing drawing areas, called views, inside of a window display area in a graphic user interface.

BACKGROUND OF THE INVENTION

One of the most important aspects of a modern computing system is the interface between the human user and the machine. The earliest and most popular type of interface was text based; a user communicated with the machine by typing text characters on a keyboard and the machine communicated with the user by displaying text characters on a display screen. More recently, graphic user interfaces have become popular where the machine communicates with a user by displaying graphics, including text and pictures, on a display screen and the user communicates with the machine both by typing in textual commands and by manipulating the displayed pictures with a pointing device, such as a mouse.

Many modern computer systems operate with a graphic user interface called a window environment. In a typical window environment, the graphical display portrayed on the display screen is arranged to resemble the surface of an electronic "desktop" and each application program running on the computer is represented as one or more electronic "paper sheets" displayed in rectangular regions of the screen called "windows".

Each window region generally displays information which is generated by the associated application program and there may be several window regions simultaneously present on the desktop, each representing information generated by a different application program. An application program presents information to the user through each window by drawing or "painting" images, graphics or text within the window region. The user, in turn, communicates with the application by "pointing at" objects in the window region with a cursor which is controlled by a pointing device and manipulating or moving the objects and also by typing information into the keyboard. The window regions may also be moved around on the display screen and changed in size and appearance so that the user can arrange the desktop in a convenient manner.

Each of the window regions also typically includes a number of standard graphical objects such as sizing boxes, buttons and scroll bars. These features represent user interface devices that the user can point at with the cursor to select and manipulate. When the devices are selected or manipulated, the underlying application program is informed, via the window system, that the control has been manipulated by the user.

In general, the window environment described above is part of the computer operating system. The operating system also typically includes a collection of utility programs that enable the computer system to perform basic operations, such as storing and retrieving information on a disc memory and performing file operations including the creation, naming and renaming of files and, in some cases, performing diagnostic operations in order to discover or recover from malfunctions.

The last part of the computing system is the "application program" which interacts with the operating system to provide much higher level functionality, perform a specific task and provide a direct interface with the user. The application program typically makes use of operating system functions by sending out series of task commands to the operating system which then performs a requested task, for example, the application program may request that the operating system store particular information on the computer disc memory or display information on the video display.

FIG. 1 is a schematic illustration of a typical prior art computer system utilizing both an application program and an operating system. The computer system is schematically represented by box 100, the application is represented by box 102 and the operating system by box 106. The previously-described interaction between the application program 102 and the operating system 106 is illustrated schematically by arrow 104. This dual program system is used on many types of computer systems ranging from main frames to personal computers.

The method for handling drawing to screen displays varies from computer to computer and, in this regard, FIG. 1 represents a prior art personal computer system. In order to provide drawing to screen displays, application program 102 generally stores information to be displayed (the storing operation is shown schematically by arrow 108) into a screen buffer 110. Under control of various hardware and software in the system the contents of the screen buffer 110 are read out of the buffer and provided, as indicated schematically by arrow 114, to a display adapter 112. The display adapter 112 contains hardware and software (sometimes in the form of firmware) which converts the information in screen buffer 110 to a form which can be used to drive the display monitor 118 which is connected to display adapter 112 by cable 116.

The prior art configuration shown in FIG. 1 generally works well in a system where a single application program with a single thread of execution 102 is running at any given time. This simple system works properly because the single application program thread 102 can write information into any area of the entire screen buffer area 110 without causing a display problem. However, if the configuration shown in FIG. 1 is used in a computer system where more than one application program, or more than one thread of execution in that application program 102 can be operational at the same time (for example, a "multitasking" computer system) display problems can arise. More particularly, if each thread in each application program has access to the entire screen buffer 110, in the absence of some direct communication between threads and applications, one thread may overwrite a portion of the screen buffer which is being used by another thread, thereby causing the display generated by one thread to be overwritten by the display generated by the other thread.

Accordingly, mechanisms were developed to coordinate the operation of the applications as well as the threads of execution within the applications to ensure that each application thread was confined to only a portion of the screen buffer thereby separating the other displays. This coordination became complicated in systems where multiple "windows" with multiple threads drawing to those windows were allowed. The problem was divided into two pieces: Managing the windows and their display area (application programs) and managing the threads of execution within those applictions. The Window Manager handles coordination between applictions and their windows. The View System handles coordination of threads within the applications and their window(s). Each window is subdivided in a hierarchy of drawing areas called "views" which are associated with specific threads of execution within a given application program.

When the application window is arranged so that views appear to "overlap", a view which appears in the window in "front" of another view covers and obscures part of the underlying view. Thus, except for the foremost view, only part of the underlying views may be drawn on the screen and be "visible" at any given time. Further, because the view can be moved or resized by the user, the portion of each view which is visible changes as other view are added, removed, moved or resized. Thus, the portion of the window which is assigned to each thread also changes as views from other threads are added, removed, moved or resized.

In order to efficiently manage the changes to the window necessary to accommodate rapid screen changes caused by moving or resizing views, the prior art computer arrangement shown in FIG. 1 was modified as shown in FIG. 2. In this new arrangement computer system 200 is controlled by one or more application programs, comprised of one or more threads of execution, of which threads 202 and 216 are shown, and which may be running simultaneously in the computer system. Each of the threads interfaces with the operating system 204 as illustrated schematically by arrows 206 and 220. However, in order to display information on the display screen, application threads 202 and 216 send display information to a central View System 218 located in the application program 204. The view system 218, in turn, interfaces directly with the screen buffer 210 as illustrated schematically by arrow 208. The contents of screen buffer 210 are provided, as indicated by arrow 212, to a display adapter 214 which is connected by a cable 222 to a display monitor 224.

In such a system, the view system 218 is generally responsible for maintaining all of the display contents that the user sees within a window during operation of the application programs. Since the view system 218 is in communication with all the treads within an application, it can coordinate between threads to insure that view displays do not overlap. Consequently, it is generally the task of the view system to keep track of the location and size of the view and the view areas which must be drawn and redrawn as views and windows are moved.

The view system 218 receives display requests from each of the application threads 202 and 216. However, since only the view system 218 interfaces with the screen buffer 210, it can allocate respective areas of the screen buffer 210 for each application and insure that no thread erroneously overwrites the display generated by another thread. There are a number of different window environments commercially available which utilize the arrangement illustrated in FIG. 2. These include the X/Window Operating environment, the WINDOWS, graphical user interface developed by the Microsoft Corporation and the OS/2 Presentation Manager, developed by the International Business Machines Corporation.

Each of these window environments has its own internal software architecture, but the architectures can all be classified by using a multi-layer model similar to the multi-layer models used to described computer network software. A typical multi-layer model includes the following layers:

User Interface

Winow Manager

Resource Control and Communication

Component Driver Software

Computer Hardware where the term "window environment" refers to all of the above layers taken together.

The lowest or computer hardware level includes the basic computer and associated input and output devices including display monitors, keyboards, pointing devices, such as mice or trackballs, and other standard components, including printers and disc drives. The next or "component driver software" level consists of device-dependent software that generates the commands and signals necessary to operate the various hardware components. The resource control and communication layer interfaces with the component drivers and includes software routines which allocate resources, communicate between applications and multiplex communications generated by the higher layers to the underlying layers. The view system handles the user interface to basic drawing operations, such as moving and resizing views, activating or inactivating views and redrawing and repainting views. The final user interface layer provides high level facilities that implement the various controls (buttons, sliders, boxes and other controls) that application programs use to develop a complete user interface.

Although the arrangement shown in FIG. 2 solves the display screen interference problem, it suffers from the drawback that the view system 218 must process the screen display requests generated by all of the application threads. Since the requests can only be processed serially, the requests are queued for presentation to the view system before each request is processed to generate a display on terminal 224. In a display where many views are present simultaneously on the screen, the view system 218 can easily become a "bottleneck" for display information and prevent rapid changes of the display by the application threads 202 and 216. A delay in the redrawing of the screen when views are moved or repositioned by the user often manifests itself by the appearance that the views and windows are being constructed in a piecemeal fashion which becomes annoying and detracts from the operation of the system.

Accordingly, it is an object of the present invention to provide a view system which can interface with application threads in such a manner that the screen display generated by each application thread can be quickly and effectively redrawn.

It is another object of the present invention to provide a view system which coordinates the display generation for all of the application threads in order to prevent the applications from interfering with each other or overwriting each other on the screen display.

It is yet another object of the present invention to provide a view system which can interact with the application threads by means of a simple command structure without the application threads being concerned with actual implementation details.

It is yet another object of the present invention to provide a view system which allows application developers who need detailed control over the screen display process to achieve this control by means of a full set of display control commands which are available, but need not be used by each application thread.

It is yet another object of the present invention to provide a view system which provides application developers with a powerful and flexible drawing environment which includes a virtual coordinate space, arbitrarily shaped views (and windows) and up to date drawing state information to facilite rapid, accurate drawing from multiple threads of execution.

It is yet another object of the present invention to provide a view system which provides application developers with an automatic system for keeping the display buffer up to date.

SUMMARY OF THE INVENTION

The foregoing problems are overcome and the foregoing objects are achieved in an illustrative embodiment of the invention in which an object-oriented viewing framework provides an extensible mechanism for grouping two or more windows and manipulating them as a group. The groups provide logical sets of windows for applying operations across address spaces to all the members of the group. The mechanism is implemented as a layer object which includes the linkages to the windows. Polymorphism and extensibility is also provided as part of the object-oriented architecture of the operating system.

BRIEF DESCRIPTION OF THE DRAWINGS

The above and further advantages of the invention may be better understood by referring to the following description in conjunction with the accompanying drawings, in which.

DETAILED DESCRIPTION OF A PREFERRED EMBODIMENT OF THE INVENTION

Figure 1:
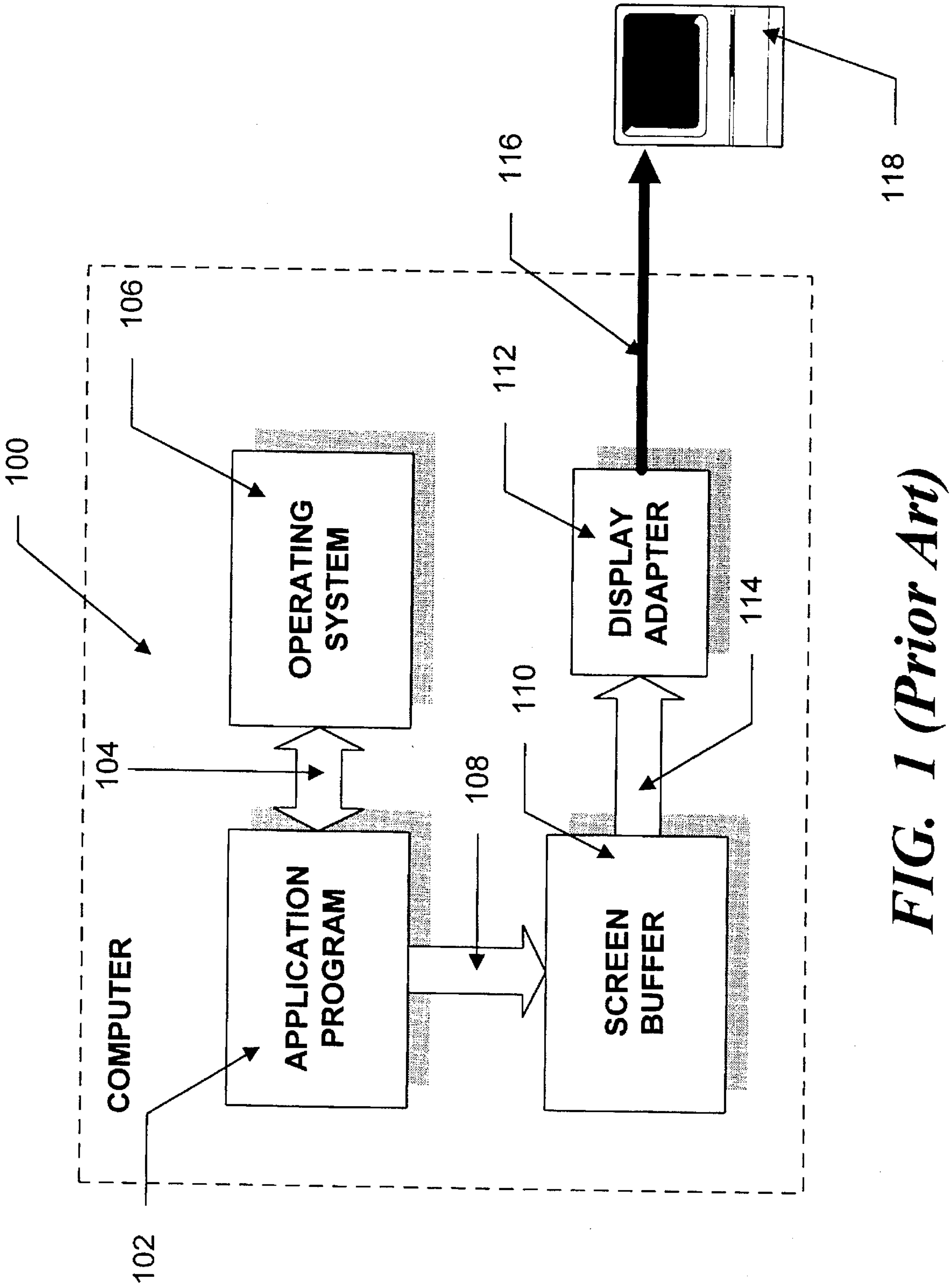
FIG. 1 (Prior Art)
FIG. 1 is a schematic block diagram of a prior art computer system showing the relationship of the application thread, the operating system, the screen buffer and, the display monitor.
Figure 2:
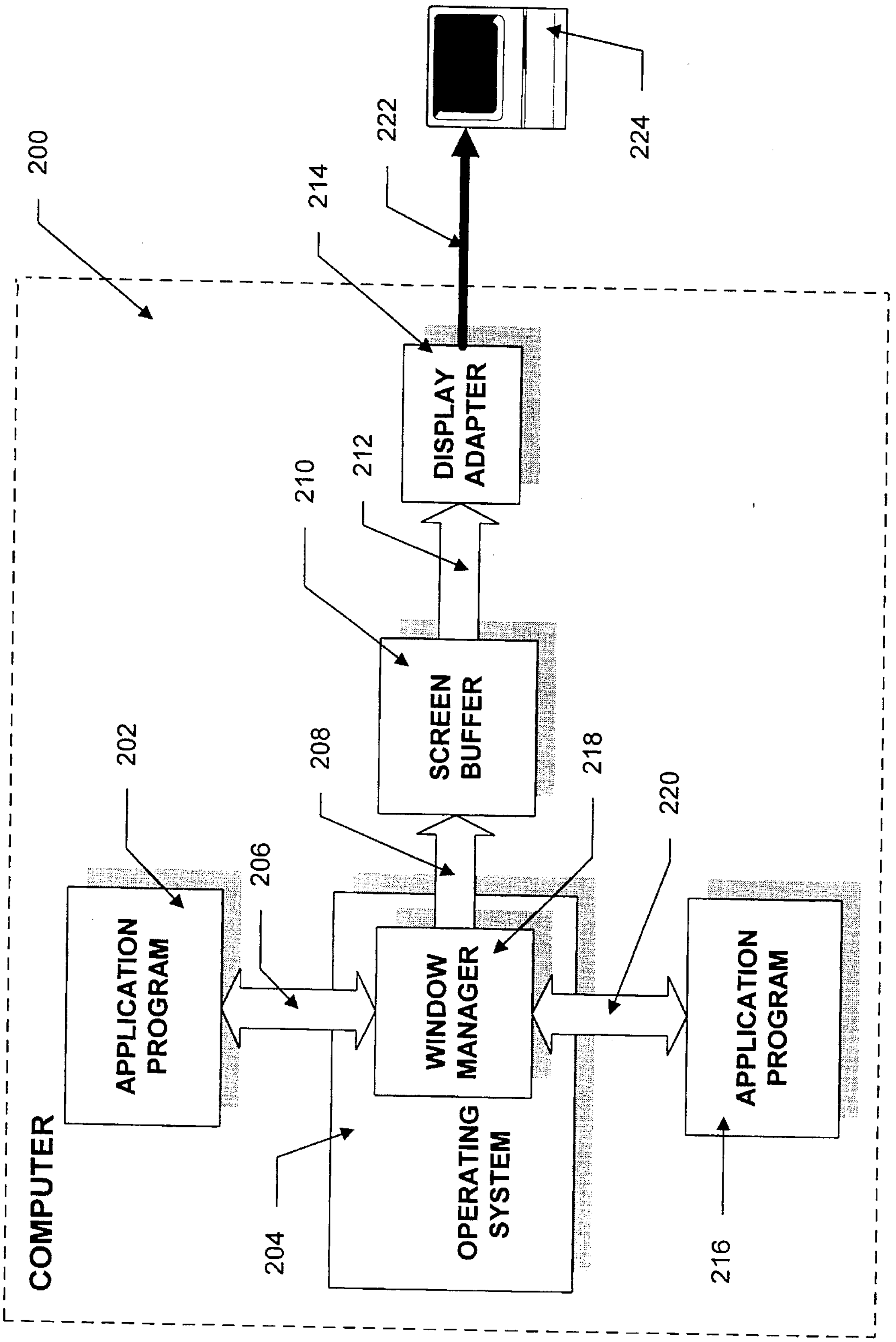
FIG. 2 (Prior Art)
FIG. 2 is a schematic block diagram of a modification of the prior art system shown in FIG. 1 which allows several application thread threads running simultaneously to generate display output in a single window.
Figure 3:
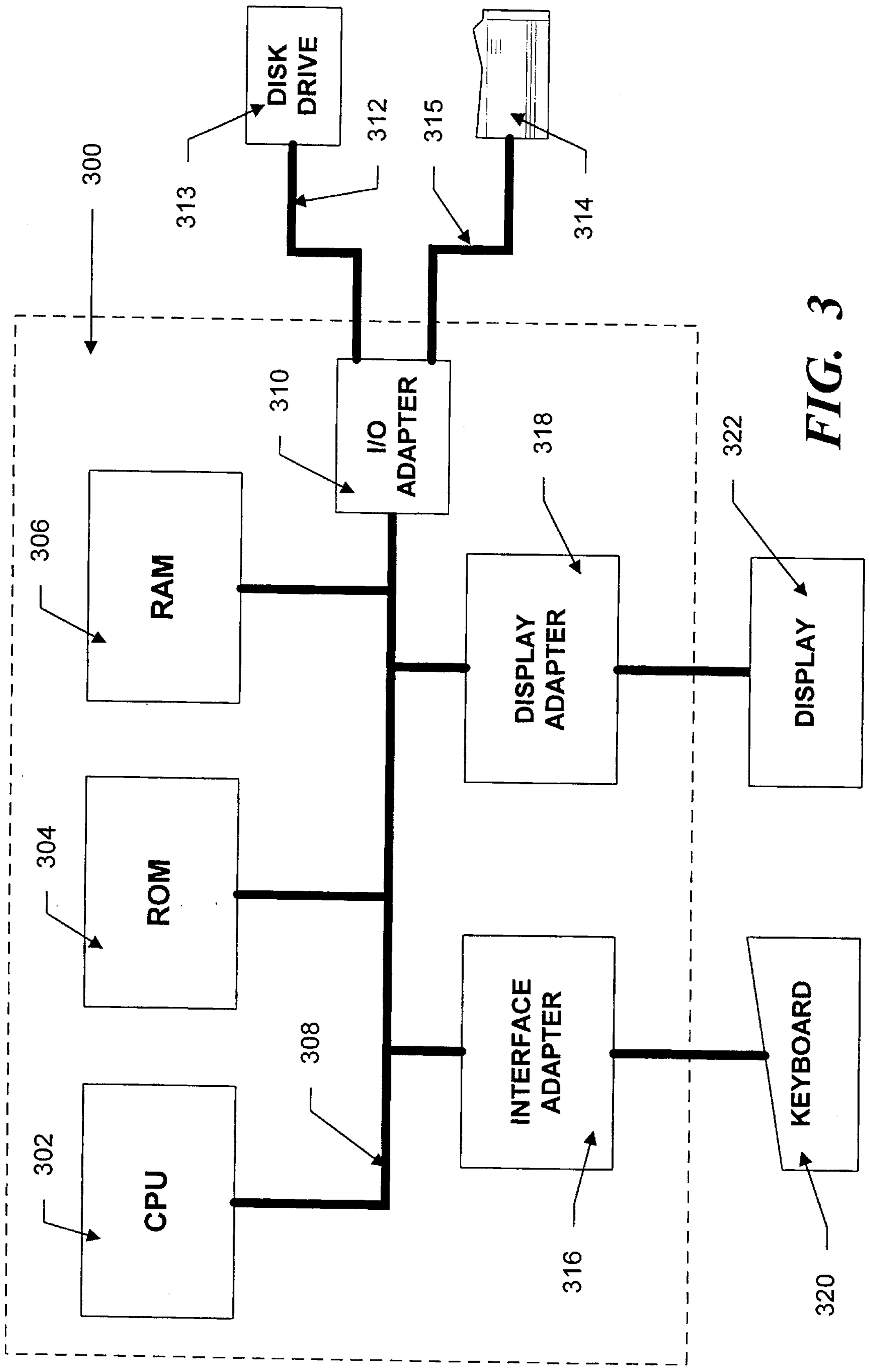
FIG. 3 is a block schematic diagram of a computer system for example, a personal computer system on which the inventive object oriented viewing framework operates.

The invention is preferably practiced in the context of an operating system resident on a personal computer such as the IBM, PS/2, or Apple, Macintosh, computer. A representative hardware environment is depicted in FIG. 3, which illustrates a typical hardware configuration of a computer 300 in accordance with the subject invention. The computer 300 is controlled by a central processing unit 302 (which may be a conventional microprocessor) and a number of other units, all interconnected via a system bus 308, are provided to accomplish specific tasks. Although a particular computer may only have some of the units illustrated in FIG. 3, or may have additional components not shown, most computers will include at least the units shown.

Specifically, computer 300 shown in FIG. 3 includes a random access memory (RAM) 306 for temporary storage of information, a read only memory (ROM) 304 for permanent storage of the computer's configuration and basic operating commands and an input/output (I/O) adapter 310 for connecting peripheral devices such as a disk unit 313 and printer 314 to the bus 308, via cables 315 and 312, respectively. A user interface adapter 316 is also provided for connecting input devices, such as a keyboard 320, and other known interface devices including mice, speakers and microphones to the bus 308. Visual output is provided by a display adapter 318 which connects the bus 308 to a display device 322, such as a video monitor. The workstation has resident thereon and is controlled and coordinated by operating system software such as the Apple System/7, operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and librarics are typically called "frameworks" and essentially provide a pre-fabricated structure for a working application.

For example, a framework for a user interface might provide a set of pre-defined graphic interface objects which create windows, scroll bars, menus, etc. and provide the support and "default" behavior for these graphic interface objects. Since frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NEXT), and Smalltalk-80 MVC (ParcPlace).

While the framework approach utilizes all the principles of encapsulation, polymorphism, and inheritance in the object layer, and is a substantial improvement over other programming techniques, there are difficulties which arise. Application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application thread, a system framework, such as that included in a preferred embodiment, can provide a prefab functionality for system level services which developers can modify or override to create customized solutions, thereby avoiding the awkward procedural calls necessary with the prior art application frameworks programs. For example, consider a display framework which could provide the foundation for creating, deleting and manipulating windows to display information generated by an application thread. An application software developer who needed these capabilities would ordinarily have to write specific routines to provide them. To do this with a framework, the developer only needs to supply the characteristics and behavior of the finished display, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multimedia, file systems, I/O, testing, etc.

Figure 4:
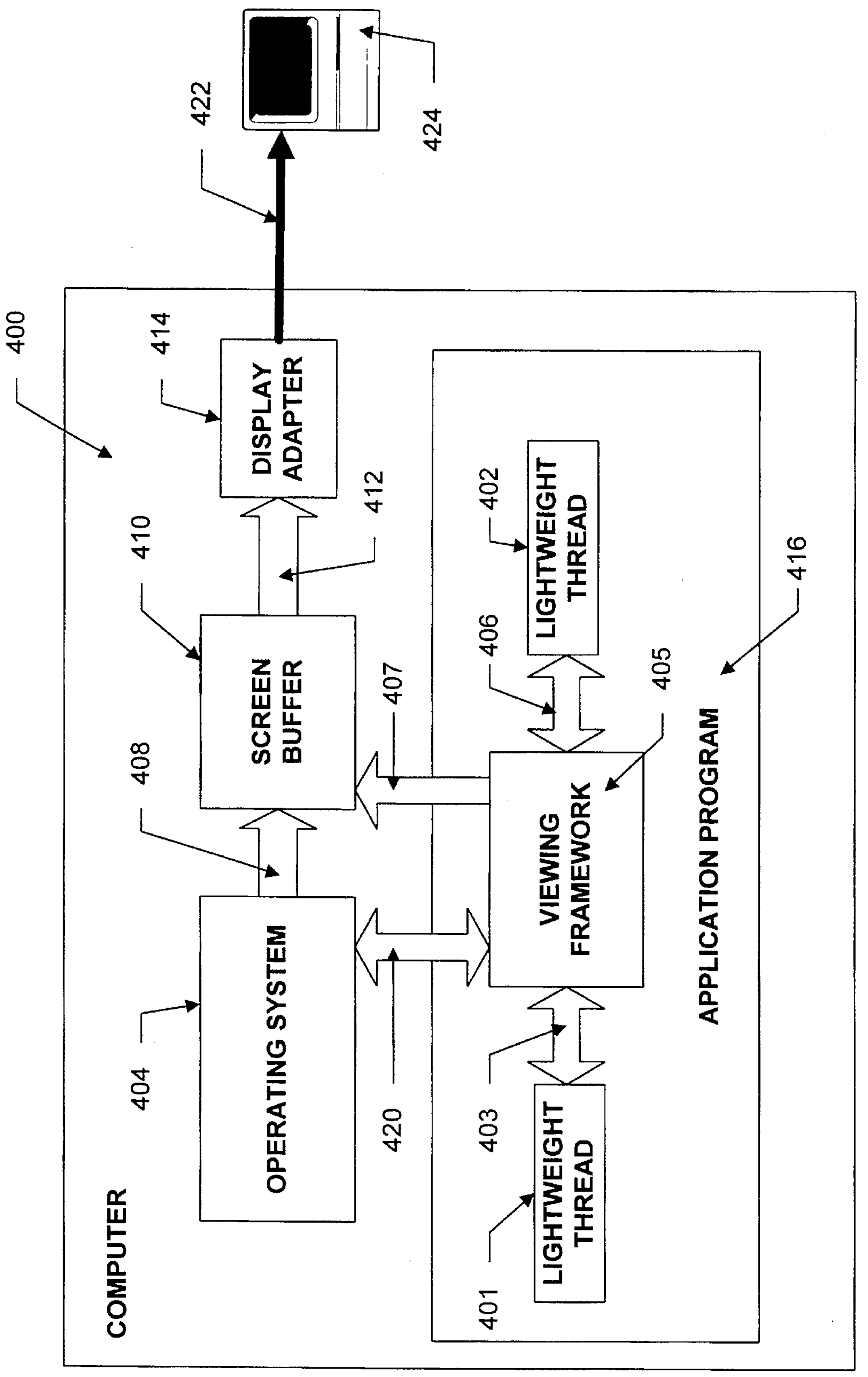
FIG. 4 is a schematic block diagram of a modified computer system showing the interaction between a plurality of application threads, the viewing framework, the window manager, and the screen buffer in order to display graphic information on the display monitor.

FIG. 4 shows a schematic overview of a computer system utilizing the object-oriented viewing framework of the present invention. The computer system is shown generally as box 400 and an application 416 with multiple threads of execution (of which application threads 401 and 402 are shown) and an operating system 404 are provided to control and coordinate the operations of the computer. In order to simplify FIG. 4, the interaction of the application 416 with the operating system 404 is limited to the interactions dealing with the screen displays. As shown in the figure, both application threads 401 and 402 interface with the view system portion 405 of the application program as illustrated by arrows 403 and 406. The view system 405, in turn, sends information to the screen buffer 410 and the operating system 404 as schematically illustrated by arrow 407 and 420.

However, in accordance with the invention, and, as shown in FIG. 4, application threads 401 and 402 also directly send information to the screen buffer 410 as illustrated by arrow 407. As will hereinafter be explained in detail, application threads 401 and 402 provide display information directly to the screen buffer 410 and retrieve stored information from the view system 405 when drawing is required. More specifically, when a view is changed, the view system 405 recomputes and stores the visible area of each view. This stored visible area is retrieved by the respective application thread and used as a clipping region into which the application draws the display information. Repainting or drawing of the view is performed simultaneously by the application threads in order to increase the screen repainting speed.

The application displays are kept separated on the display screen because the view system 405 recomputes the view visible areas so that none of the areas overlap. Thus, if each application thread, such as application thread 401 or application thread 402 draws only in the visible area provided to it by the view s system 405, there will be no overlap in the displays produced by the screen buffer. Once the display information is drawn into the screen buffer 410 it is provided, as indicated by arrow 412, to a display adapter 414 which is, in turn, connected by cable, or bus, 422 to the display monitor 424.

Figure 5:
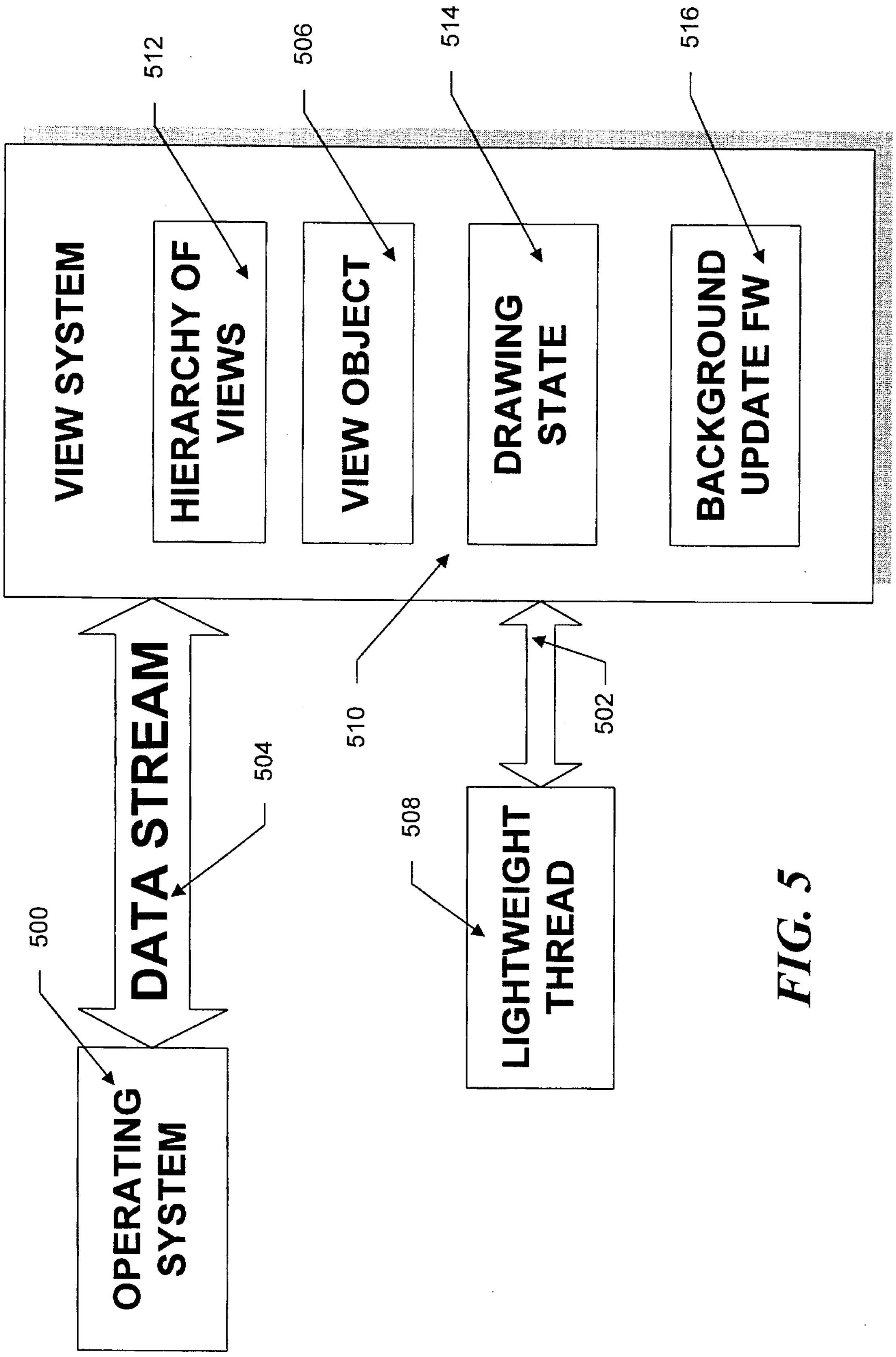
FIG. 5 is a block schematic diagram of the information paths which indicate the manner in which an application thread communicates with the inventive object oriented viewing framework and then directly to the screen buffer.

The interaction of an application thread with the view system is illustrated in more detail in schematic diagram FIG. 5. As previously mentioned, the view system (illustrated as box 510 in FIG. 5) is an object-oriented program. Accordingly, an application thread 508 interfaces with the view system by creating and manipulating "objects". In particular, each application thread creates a view hierarchy object, for example, view hierarchy object 512 in order to communicate with view system 510. The application thread 508 then communicates with the view hierarchy object 512 by creating a view object 506 and installing it in the hierarhcy as shown schematically by arrow 502. The view system itself is an object which is created when the application program is started. The view system 510 interfaces with the operating system 500 via a data stream 504 to perform window operations on behalf of the appliction program and view system 510.

As will hereinafter be described in more detail, each view object 506 includes a small data store or "cache" area, called the drawing state 514 which is used to store the associated view visible area and other drawing-related state (coordinate system etc.). When the application thread desires to redraw the information in one of its associated views, the view object first checks cache status. If the information stored in the cache has not been changed or invalidated, then this information is used to redraw the window. The use of the cache area reduces the time necessary to complete a redrawing operation.

Since many view objects may be created simultaneously in order to simultaneously display many views within a window, each view object 506 communicates with the view system 510 by means of multitask-safe method calls 502. The view system communicates with the operating system (usualy the window server) via data stream 504 by creating "stream" objects which contain the software commands necessary to transfer information from one object to another. For example, when operating system 500 desires to transfer information to view system object 510, operating system 500 creates a stream object which "streams" the data into view system object 510. Similarly, when view system object 510 desires to transfer information back to operating system 500, view system object 510 creates a stream object which "streams" the data into window object 500. Such stream objects are conventional in nature and not described in detail herein. The stream objects which carry data from operating system 500 to view system object 510 and the stream objects which carry information from view system object 510 to operating system 500 are illustrated collectively as arrow 504.

As shown in FIG. 5, view system object 510 consists of four main parts: the view hierarchy framework 512, the one or more view objects (and their associated command objects) installed in the hierarchy 506, the drawing state cached for each view in the hierarchy 514, and the framework to support background updating of "dirty" areas within views intalled in the hierarchy 516. The background drawing framework 516 includes an independent task which is started by the view system 510 when the view system 510 is created. As will be hereinafter explained in detail, the background updating framework is responsible for refreshing the portions of the views 506 in the view hierarchy 512 which are visible on the data display screen and have become invalid via view hierarchy changes, local view changes, or window manipulations. To this end, it collects areas in need of updating, recomputes a view's visible area intersected with the "dirty" area and tells the affected view to refresh only that portion of itself that is invalid.

The drawing state cache 514 is comprised of a number of different objects which together store information related to the drawing attributes and environment for the associated view. The drawing state cache is created by the view system on behalf of individual views and maintained by the view system including a "time stamp" indicating the time of the last modification.

As previously mentioned, in accordance with a preferred embodiment, the operating system is capable of running multiple threads simultaneously and, whenever two or more threads are operating simultaneously, there is a potential for mutual interaction. Such mutual interaction can occur when two or more threads attempt to access simultaneously shared resources, such as the shared data area or the window list. Accordingly, concurrency controls are necessary to manage such interactions and to prevent unwanted interference. An illustrative concurrency control technique known as a monitor is used in one embodiment. Monitors are well-known devices which are used to "serialize" concurrent access attempts to a resource and provide an object-oriented interface. In particular, before a thread can access a resource which is controlled by a monitor, the thread must "acquire" the monitor. When the thread is finished with the resource it releases the monitor for acquisition by another thread. Each monitor generally has a request queue associated with it so that requests to acquire the monitor which cannot be honored (because the monitor has been acquired by another thread) are held on the queue (called "blocking"). Monitors also provide a mechanism to prevent acquisition until a specified "condition" has been met.

In the present system, monitors are used to protect several different shared resources. In particular, a view system monitor is used to prevent the application threads from interacting with the view system simultaneously and corrupting data. Before accessing the cached drawing data, each application thread must acquire the view system monitor. The monitor used in the present system allows individual threads to "reacquire" a given monitor to prevent a thread dead-locking with itself.

Figure 6:
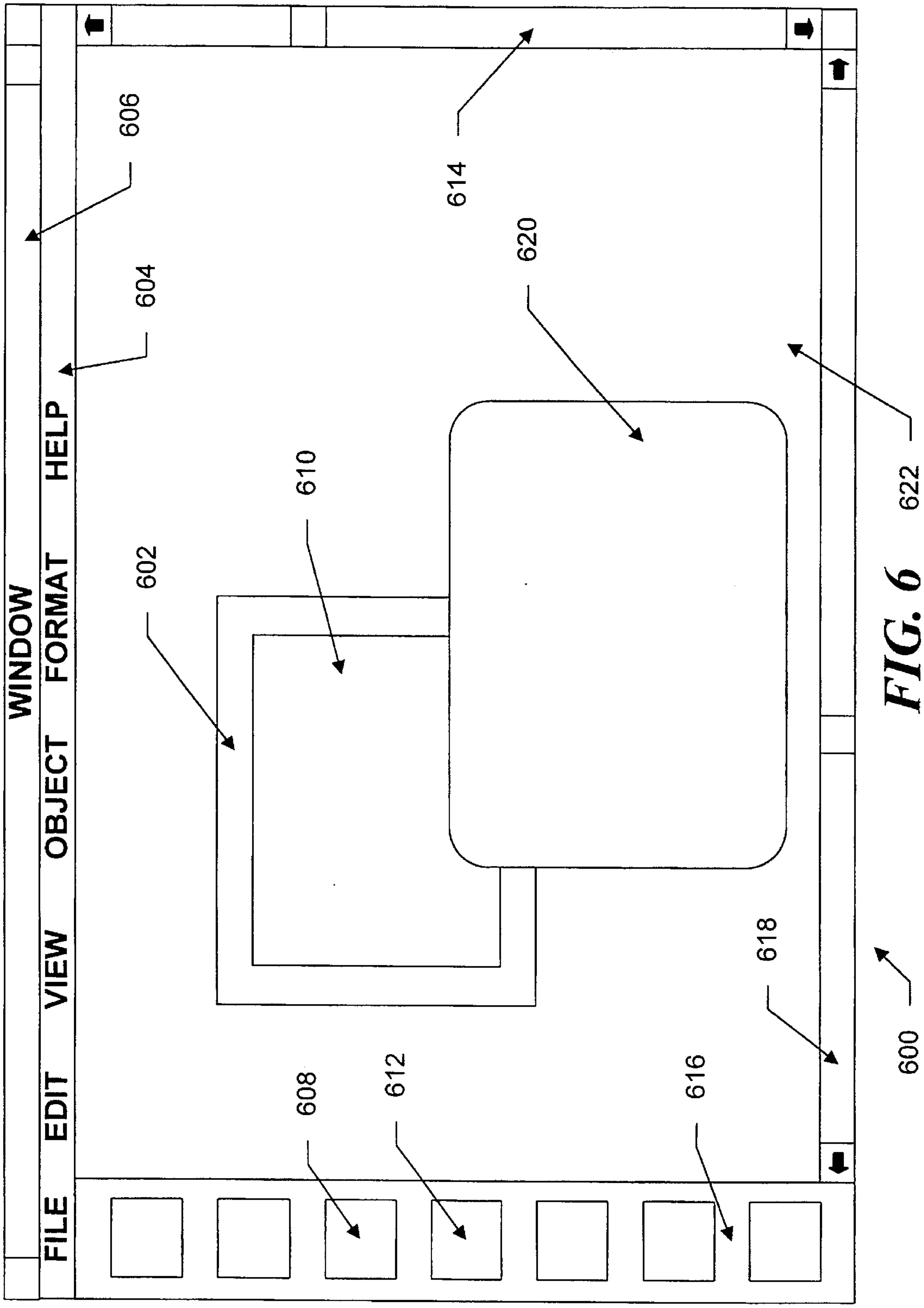
FIG. 6 is a schematic diagram indicating the typical appearance of a graphical user interface which is supported by a object-oriented viewing framework illustrating the components and parts of a window and the view hierarchy which is contained within.

FIG. 6 shows an illustrative screen display generated by a typical "window environment" program. A window 600 is a rectangular area enclosed by borders which can be moved and resized in a conventional manner. The window 600 usually includes a title bar 606 and a menu bar 604, each of which are a view and may themselves contain other views. The menu bar 604, also a view allows access to a number of pull-down menus (not shown) that are operated in a well-known manner and allow the user to access various file, editing and other commands.

The area remaining within the window, after excluding the title bar 606, the menu bar 604 and the borders, is called the "content" view and constitutes the main area that can be drawn or painted by an application thread such as a drawing program. A content view may enclose additional views called "child" views that are associated with the one or more application threads. In this case the containing view is called a "parent" view or "container" view in relation to the child view(s). Each child view may also have one or more child views associated with it for which it is a parent view and so on, thus construction a view hierarchy.

Many application threads further sub-divide the content view into a number of child views which are independently controlled. These typically include a document view 622, a "toolbar" or "palette" view 616, and, in some cases, a status line view (not shown). The document view 622 may be equipped with horizontal and vertical scroll bar views, 618 and 614, that allow objects in the document view to be moved on the screen. The document view 622 may be further sub-divided into child views 602, 610 and 620 which may also overlap each other (and need not be rectangular). At any given time usually only one of the child views 602, 610 and 620 is active and only one view has input "focus". Only the view which has input focus responds to input actions and commands from the input devices such as the mouse and the keyboard. A view which responds to keyboard entries is also called a non-positional view because it responds to input other than repositioning and resizing commands.

The toolbar/palette view 616 usually contains a number of iconic images, such as icons 608 and 612, which are used as a convenient way to initiate certain, often-used programs or subroutines. For example, icon 608 may be selected to initiate a drawing routine which draws a box on the screen, whereas icon 612 might initiate a spelling checker program. The operation of such toolbars and palettes is generally well-known and will not be described further herein.

The displayed controls are generally selected by means of a mouse or other input device. The mouse controls a cursor that is drawn on the screen by the operating system. When the cursor is positioned over the graphic image to be selected, a button is activated on the mouse causing the view system to respond.

Figure 7A:
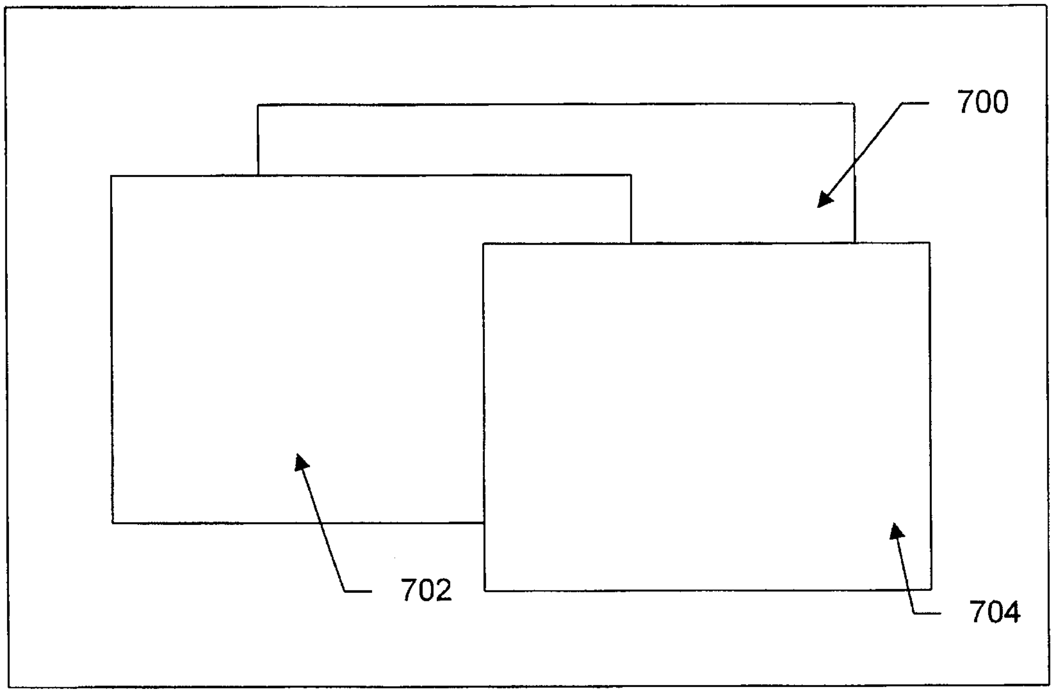
FIGS. 7A and 7B illustrate the portions of the view hierarchy which must be redrawn when a view is resized.
Figure 7B:
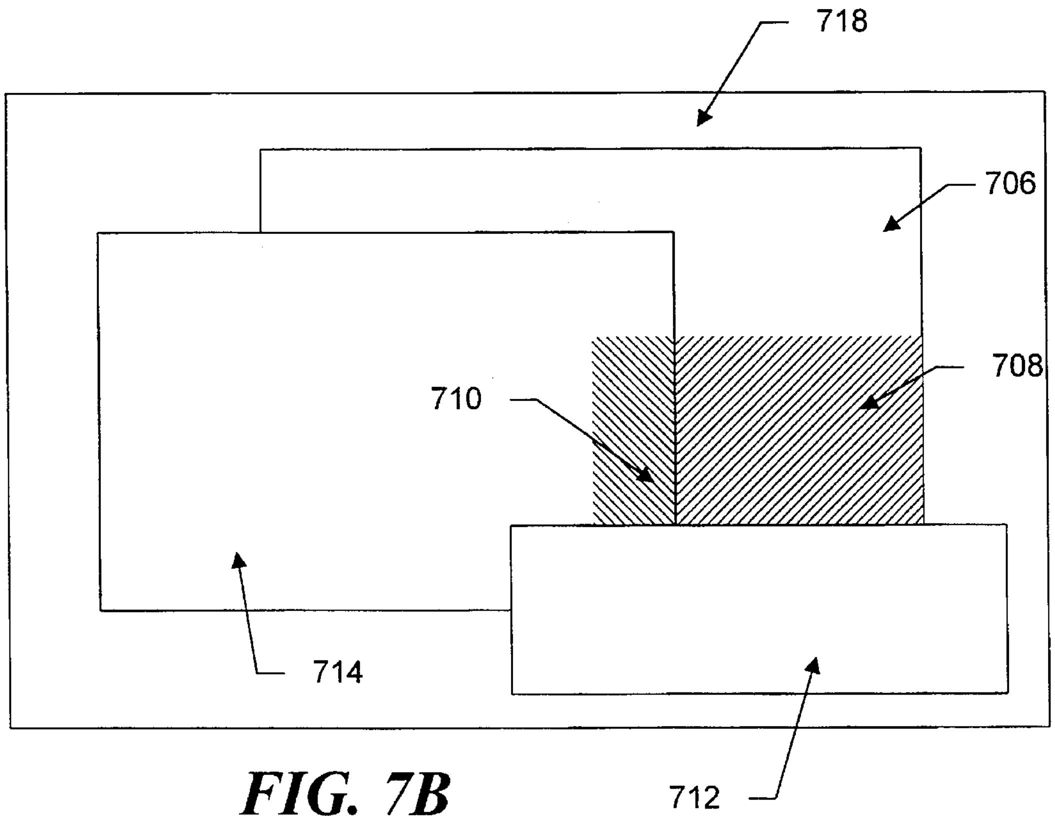

Although the controls discussed above generally cannot be moved or resized by the application thread, the content view and child views are usually totally under control of the application thread. When an application thread has several views, or several application threads, which are running simultaneously, and displaying information views, changes in the size or the position of one view will change the displayed or visible areas of views which are "under" the changed view. FIGS. 7A and 7B illustrate how a manipulation of one view associated with an application can change the visible areas of other views that are associated with the same application and inside the same window.

In particular, FIG. 7A shows three views located inside a window. The views overlap—view 700 is in the background, view 702 is in front of view 700 and view 704 is in front of view 702. As shown in FIG. 7A, view 704 obscures portions of views 702 and 700. Since each of views 700, 702 and 704 can be independently moved and resized, it is possible when the foremost views 702 or 704 are moved or resized, areas in the overlapped views can be uncovered or covered and thereby change the visual appearance of these views. However, due to the overlapped appearance of the views, a change to a selected view only affects view behind the selected view. For example, a change to view 704 can affect views 702 and 700, but a change to view 700 cannot affect views 702 or 704 since these latter views overlap and obscure portions of view 700.

FIG. 7B indicates the effect of a resizing of the front view 704 in FIG. 7A. In particular, FIG. 7B illustrates three views 712, 714 and 706, which correspond to views 704, 702 and 700 in FIG. 7A, respectively. However, in FIG. 7B, view 712 has been resized and, in particular, reduced in size from the original size view 704. The reduction in the size of view 712 exposes an area (illustrated as shaded area) of view 710 that was previously totally covered by view 712. Similarly, the shaded portion 708 of view 706 is also uncovered. In accordance with normal view system operation, only visible portions of views are painted. Accordingly, areas 708 and 710 must be redrawn or repainted as they have now become visible areas. These areas in need of redrawing are said to be "dirty" areas or "update" areas. This redrawing is accomplished by a coordination between the view system's background updating framework and the application thread which "owns" the dirty area as previously described.

Specifically, the view system computes the new visible area of each changed view and all views that lie behind the changed view. The view system then sends an "update request" to each view associated with a changed area indicating to the view that part of its visible area which must be redrawn. Each view, in turn, will proceed to update the visible area by directly writing into the screen buffer.

Figure 8A:
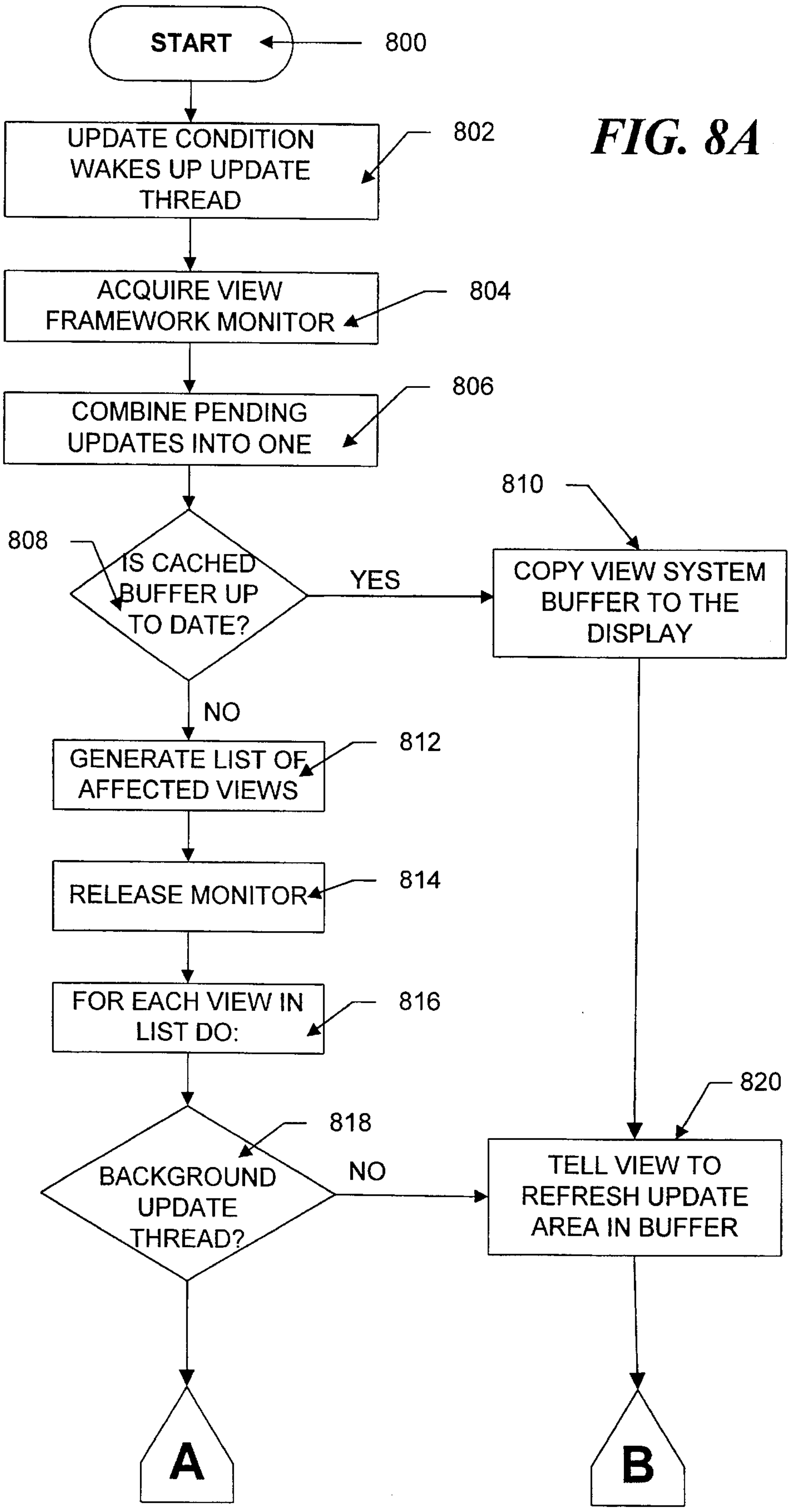
FIGS. 8A and 8B is an illustrative flow chart of a method by which the object oriented viewing framework supports updating of dirty areas on the display by means of a background thread(s) in order to display information on the display screen.
Figure 8B:
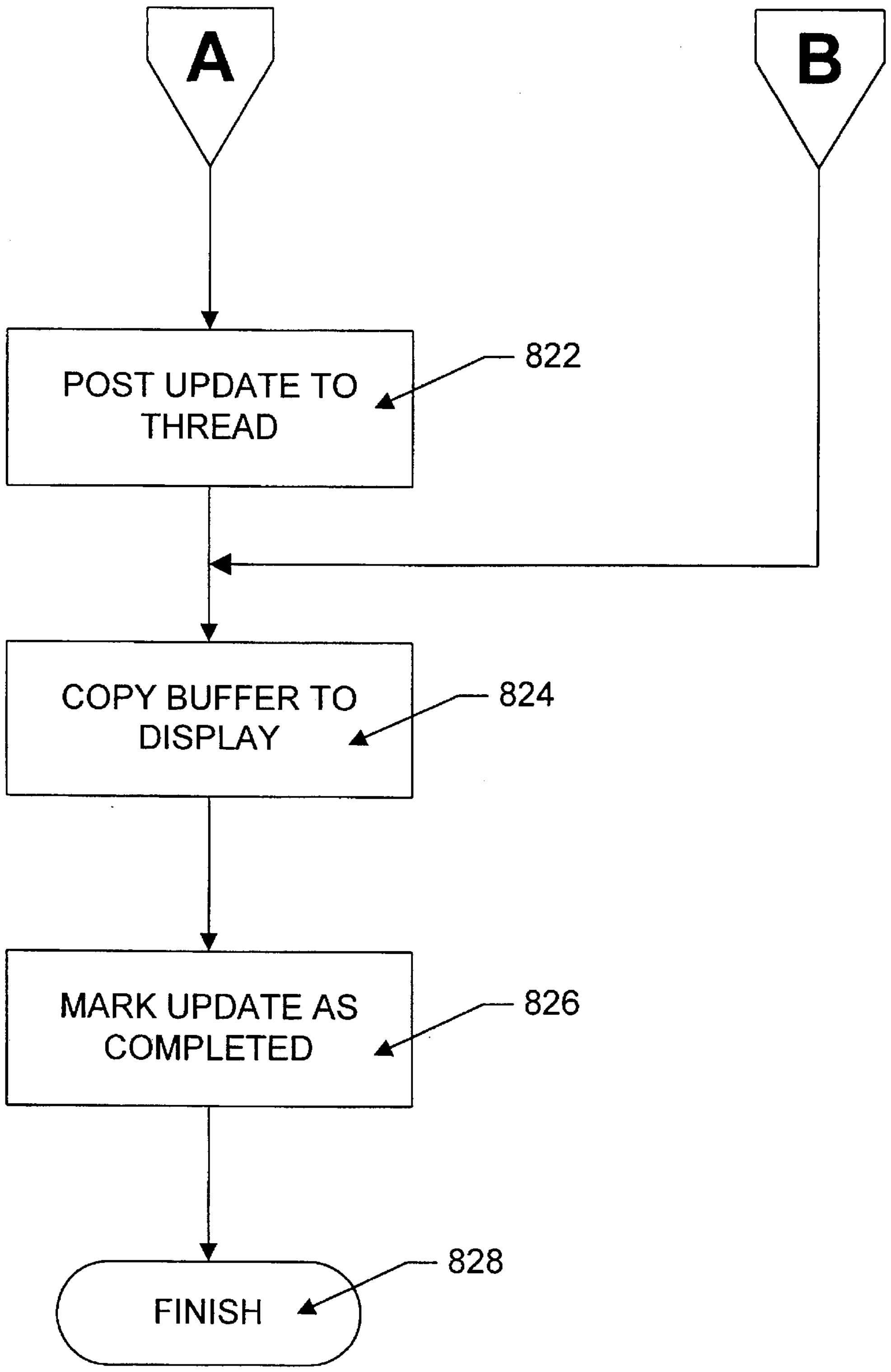

The process of repainting a new visible area is shown in detail in the flowchart illustrated in FIG. 8. In particular, the repainting routine starts in step 800 and proceeds to step 802 where the background updating framework receives an upate request from the view system. An update request might be generated when the view system resizes a view as illustrated in FIGS. 7A and 7B or in response to a newly uncover window area. In response, the updating framework acquires the view system monitor in function block 804, retrieves all the pending updates and combines them into a single update object as represented in step 806. A time stamp is then checked to see if the view system display buffer is out of date, step 808. If the buffer is up to date, then it is copied to the display as in step 810. If the time stamp is out of date, then the view system display buffer must be recached. In step 812, a list of the views which overlap the update area is generated. At this point, the view system monitor is release 814. The background updating framework then iterates through each view in the update list 816 and determines if the view has as associated application thread for processing updates 818.

If the view does not have a background updating thread of its own, then the view system background updating mechanism, itself, tells the view to redraw the dirty area into the view system display buffer 820. If the view does have its own updating thread, then the dirty are within that view is handed off to the view's update thread 822 (which will cause the buffer to be updated and copied to the display at a later time). At this point, the up to date view system display buffer is copied to the display device buffer 824, the portion of the update associated with that view is marked as completed by the background updating framework 826, and the thread goes back to waiting for further updates 828.

Figure 9:
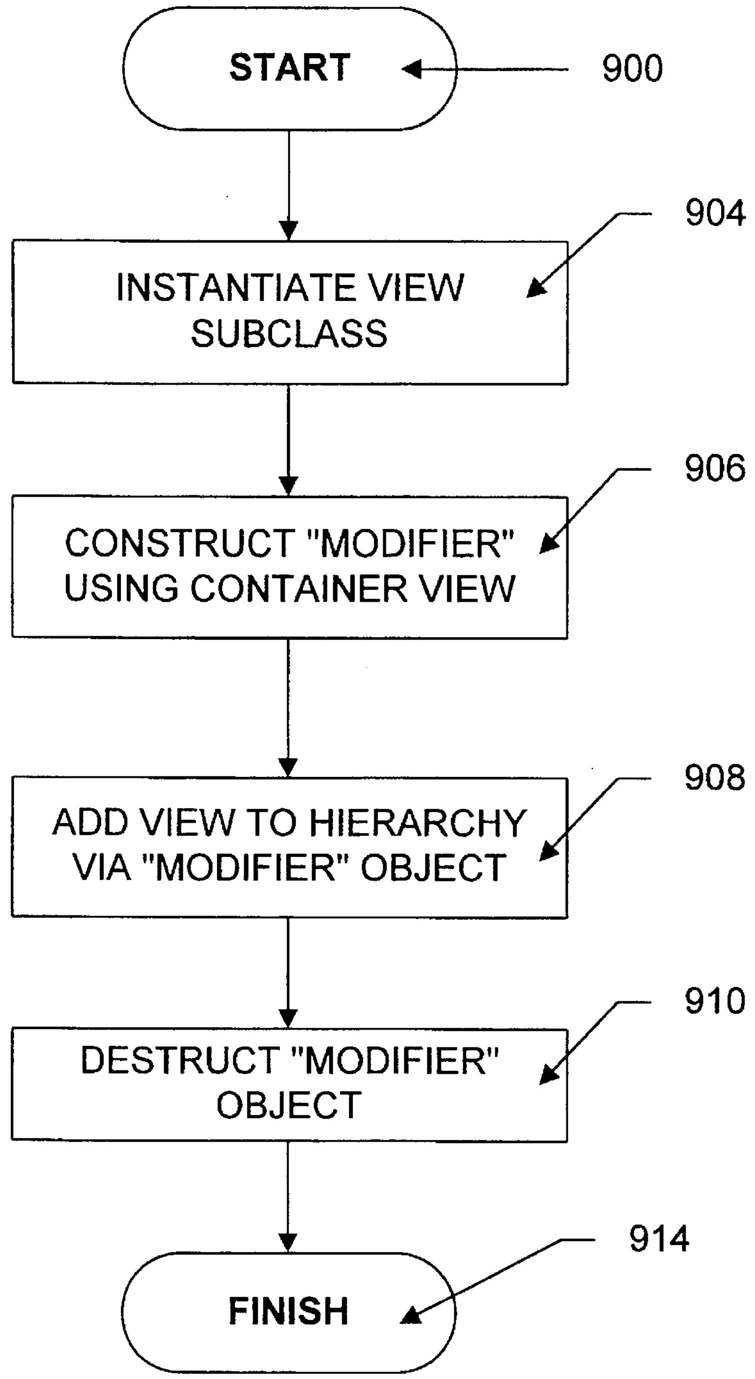
FIG. 9 is an illustrative flow chart of a method used by the application thread to create a new view and install it in the view hierarchy.

Also as previously mentioned, a view object can interact with the view system object to provide various view hierarchy management functions, such as creating a new view and adding it to the hierarchy. An illustrative routine used by the application developer to create a new view is shown in detail in the flowchart of FIG. 9. The routine starts in step 900 and proceeds to step 904 in which a new child view is constructed.

After the view is constructed and initialized in step 904, the routine proceeds to step 906 in which a "modifier" object is created to allow modifications of the view hierarchy. In step 908 the "Add" method on the modifier object is called and the newly constructed child view is added to the view hierarchy. The modifier object may then be thrown away as in step 910. The routine finishes in step 914.

Figure 10:
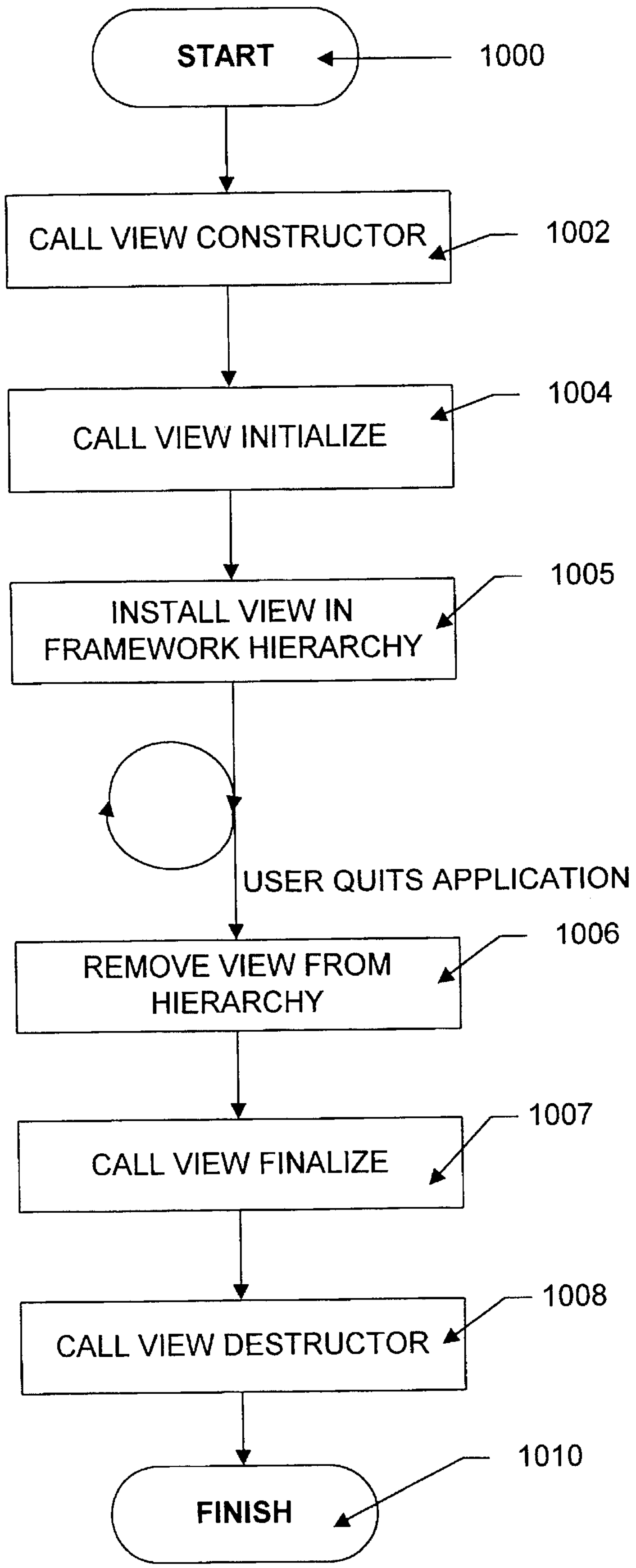
FIG. 10 is an illustrative flow chart of a method used to support polymorphic initialization and finalization of a view framework object.

As previously mentioned, the view system provides a framework that extends the intrinsic abilities of the C++ language to support construction and initialization of C++ objects. The steps involved in using the initialization and finalization support provided by the view system are detailed in the flow chart FIG. 10. The routine starts in step 1000 and the view object in question is constructed in step 1002 (using the standard C++ "constructor" facility.) After the construction of the object is complete, the "Initialize" method of the view object is called automatically by the run time system as illustrated in step 1004. A limitation of the C++ construction facilities makes it impossible to make virtual method calls from with the constructor of an object. The "Initialize" method provides a mechanism for calling virtual methods on an object after the construction is complete, but before any other methods are called on the object. This is particularly useful for subclasses which need to modify base class behavior at construction or initialization time. Once the user quits the running application, or some other event causes the view hierarchy (or even a single view) to be in need of destruction, a similar mechanism is used to insure that a "Finalize" method is called by the run time system before the object's destructor is run. This mechanism makes it possible to override behavior in the base class related to finalizing or destroying an object. Step 1006 illustrates the removal of the view from the hierarchy, the run time system calling the view's "Finalize" method, step 1007, the destructor of the view being called, step 1008 and the operation finishing in step 1010.

Figure 11:
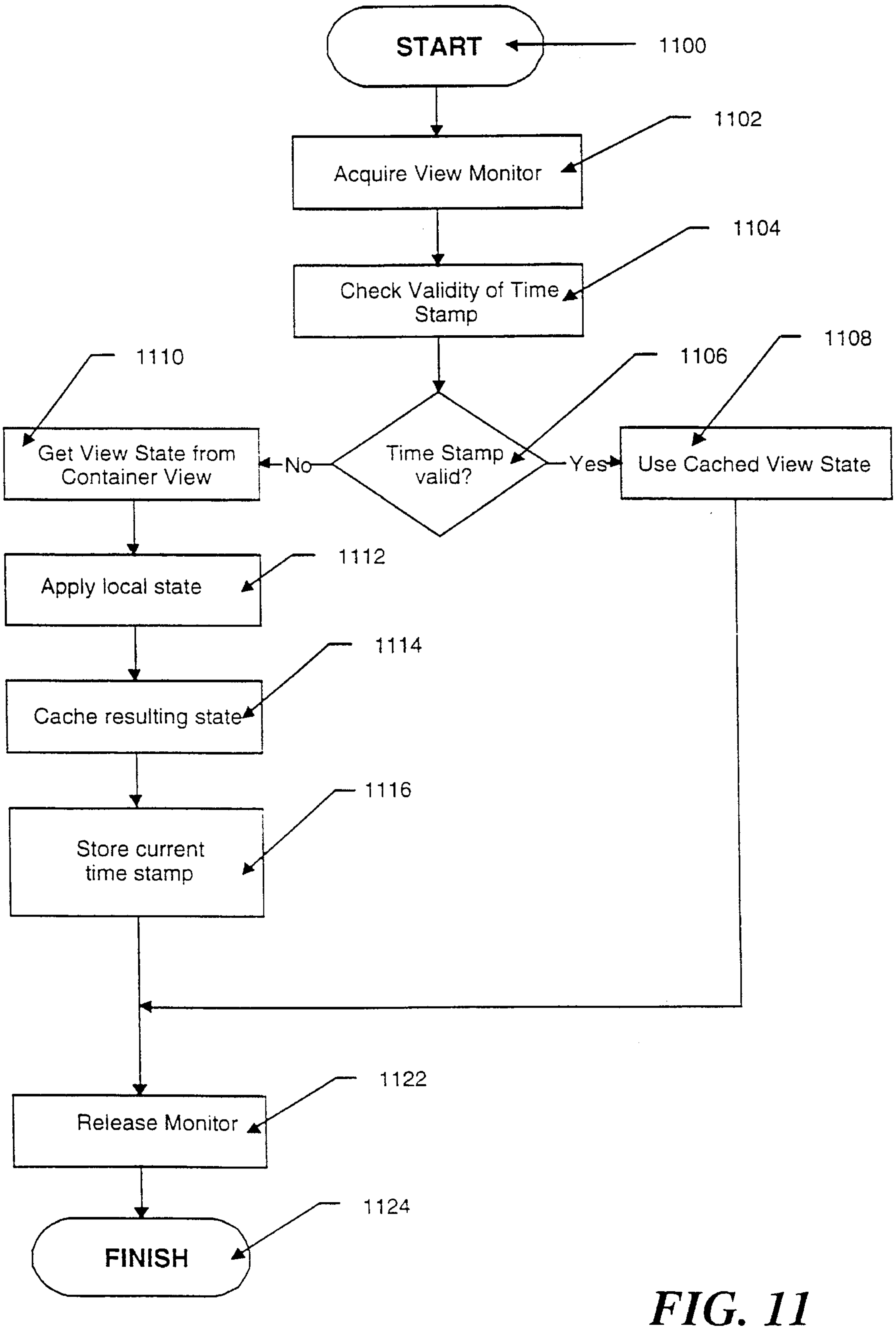
FIG. 11 is an illustrative flow chart of the method by which an application thread requests any state drawing information from the object oriented viewing framework.

FIG. 11 is a flow chart of an illustrative routine used by the view system to keep individual views in sync with any changes in the view system that might affect them. The routine starts in step 1100. The view monitor is acquired in step 1102. This monitor lock prevents further changes from happening in the view system for the duration of the routine. A time stamp within the view object is compared with the view system time "clock" in step 1104 to determine if the cached view state is now out of date, step 1106. If the cache is up to date, it is provided to the caller, step 1108. The view monitor is released 1122 and the routine completes. If the time stamp in step 1106 is out of date, then the view state needs to be recompted. Step 1110 takes a copy of the parent view's state (which will go through a similar routine as outline in FIG. 11 to provide its state to the child view). The view object then adds in any local state information, for instance the distance the view is offset from its parent view and the difference between the area "owned" by the parent view and itself, step 1112. Once the up to date state has been computed, it is recached (step 114), along with the up to date time stamp, step 1116. The view monitor is released 1122 and the routine is completed, step 1124.

Figure 12:
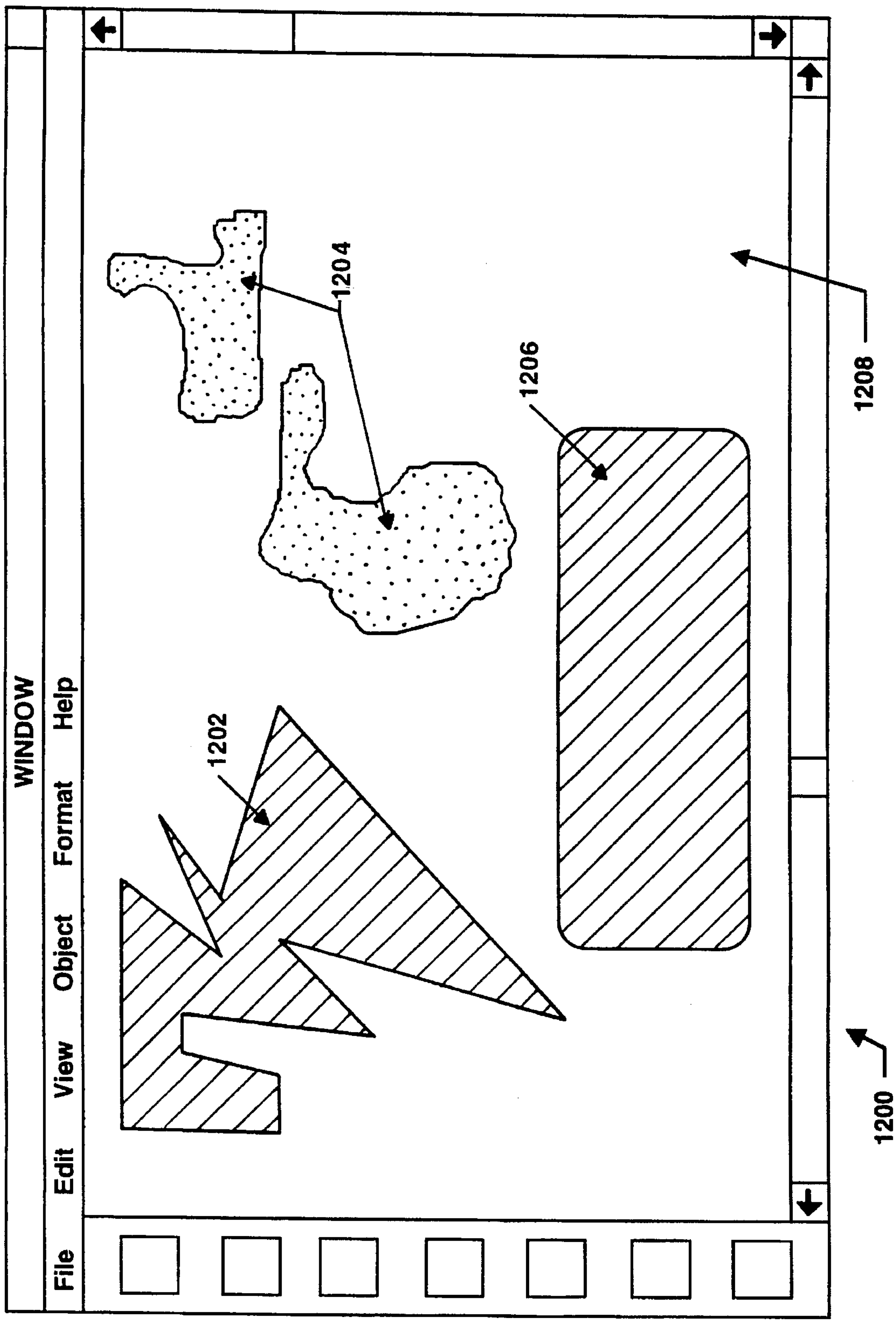
FIG. 12 is a block schematic diagram of non rectilinear, disjoint views within the view hierarchy supported by the object-oriented viewing framework.

The schematic diagram in FIG. 12 illustrates three different views that demonstrate the variety of view areas support by the view system framework. The enclosing window object 1200 is similar to the one described above in FIG. 6. The application developer-owned content view 1208 is contained within the window 1200. View 1206 is a child view of the content view which is non rectangular, although of somewhat conventional shape. View 1202 is a non rectilinear view which is a closed polygon. It is also a child view of the content view 1208. The third child view 1204 in the content view 1208 is a non contiguous view which has two separate, non rectilinear portions. In this example, the child views do not overlap and a front to back ordering is not implicit. This is not meant to imply that ordering (and hence clipping) is not possible, only that it is not demonstrated in this figure.

Figure 13:
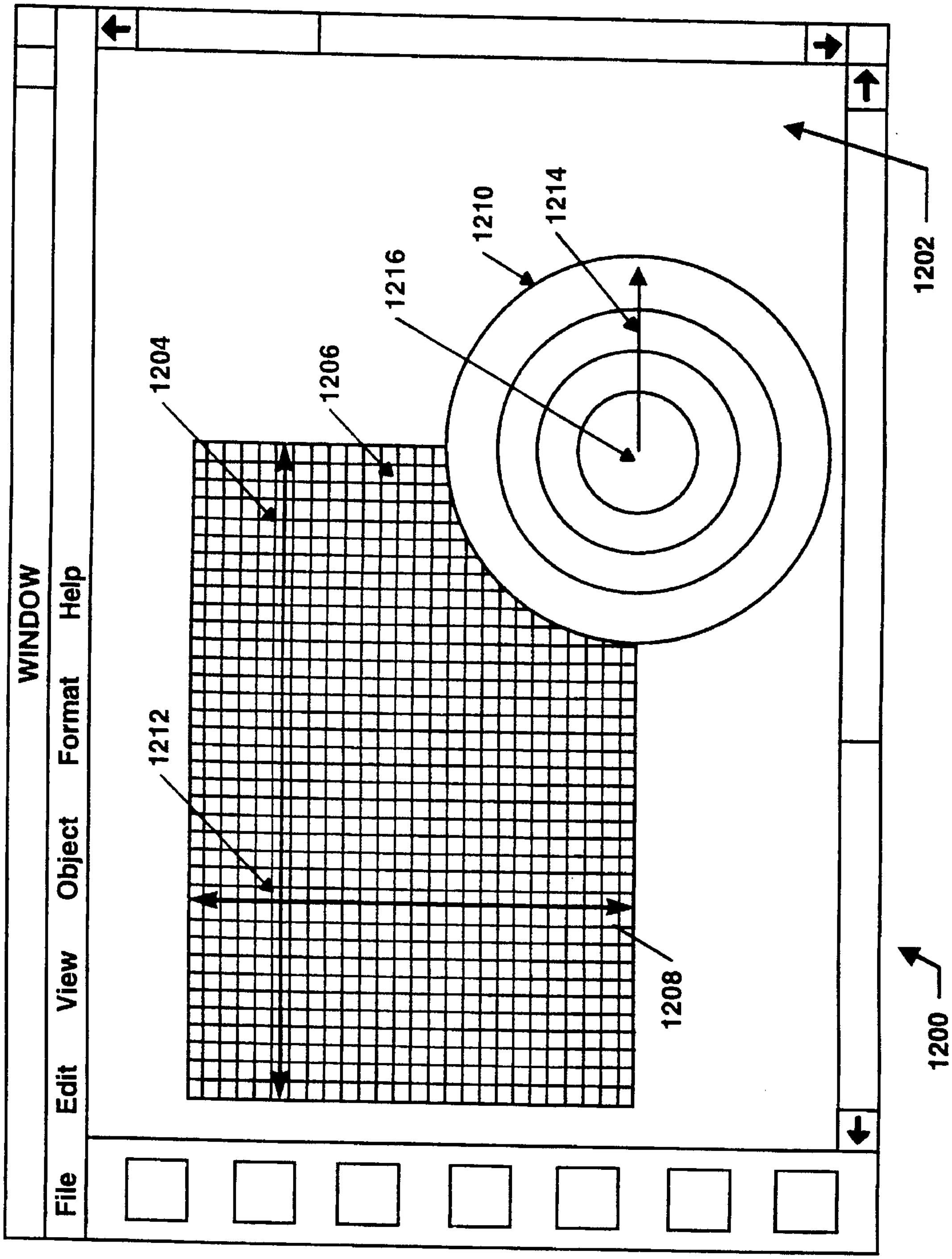
FIG. 13 is a block schematic diagram of the multiple coordinate spaces support by the object-oriented viewing framework.

The schematic diagram in FIG. 13 illustrates two possibilities for coordinate spaces within any given view. The coordinate planes in any given view are usually invisible, but have been made visible in this figure for ease of explanation. The window 1200 is similar to that described in FIG. 6. The developer-owned content view 1202 is contained with the window 1200. Two child views of the content view are illustrated in this figure, view 1210 and view 1206. View 1206 is a view with the default coordinate system provided by the viewing framework. It consists of an X 1204 and Y 1208 axis that extend off into positive and negative infinity. By default, the "origin" is located in the top, left corner of the bounding rectangle of the view. In view 1206, the origin 1212 has been move slightly, but no other changes to the standard coordinate space have been made. In view 1210, a polar coordinate system is in operation. The origin 1216 of the view is located in the center of the view 1210. As in the Cartesian coordinate system in view 1206, the polar coordinate system in view 1210 extends off into infinity as demonstrated by the arrow 1214. Both the illustrated coordinate systems are standard two dimensional coordinate planes. Three dimensional (3D) coordinate spaces are also possible, but not implicitly support by the viewing framework. To use a 3D coordinate space, the developer would need to provide a 3D to 2D mapping for use by the viewing framework. In general, this is not a problem, because the graphics system implicitly supports 3D objects in a 2D coordinate plane.

Figure 14:
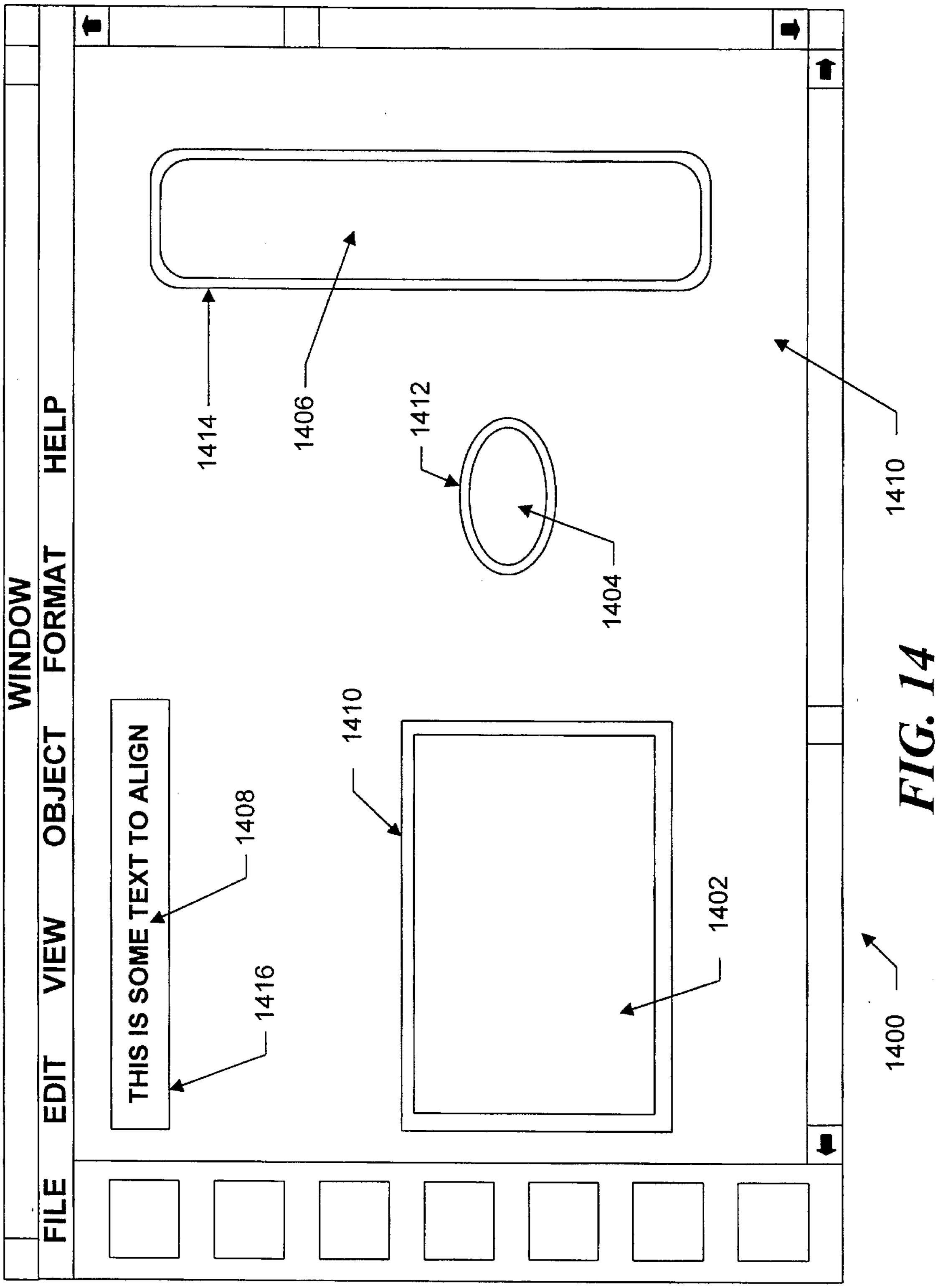
FIG. 14 is a block schematic diagram of alignment of view objects based on their center of gravity specification by the object-oriented viewing framework.

The schematic diagram in FIG. 14 illustrates the alignment and layout mechanism provided by the viewing framework. The window 1400 is similar to the window described in FIG. 6. The developer-owned content view 1410 is contained within the window 1400. The views 1410, 1412, 1414 and 1416 are all child views of the content view. These views are objects provided by the viewing framework which are used explicitly for laying out other view objects. Although it is not possible to actually see the layout views (they do not have any drawing capabilities), they are installed in the view hierarchy immediately above the views for which they hold layout attributes. View 1402 is a child view of the layout view 1410. View 1404 is a child view of the layout view 1412. View 1406 is a child view of the layout view 1414. View 1408 is a child view of the layout view 1416. Views 1410, 1412 and 1414 have attributes that cause them to be horizontally aligned at the center point. View 1416 and 1410 are also vertically aligned, both on the left side.

Figure 15:
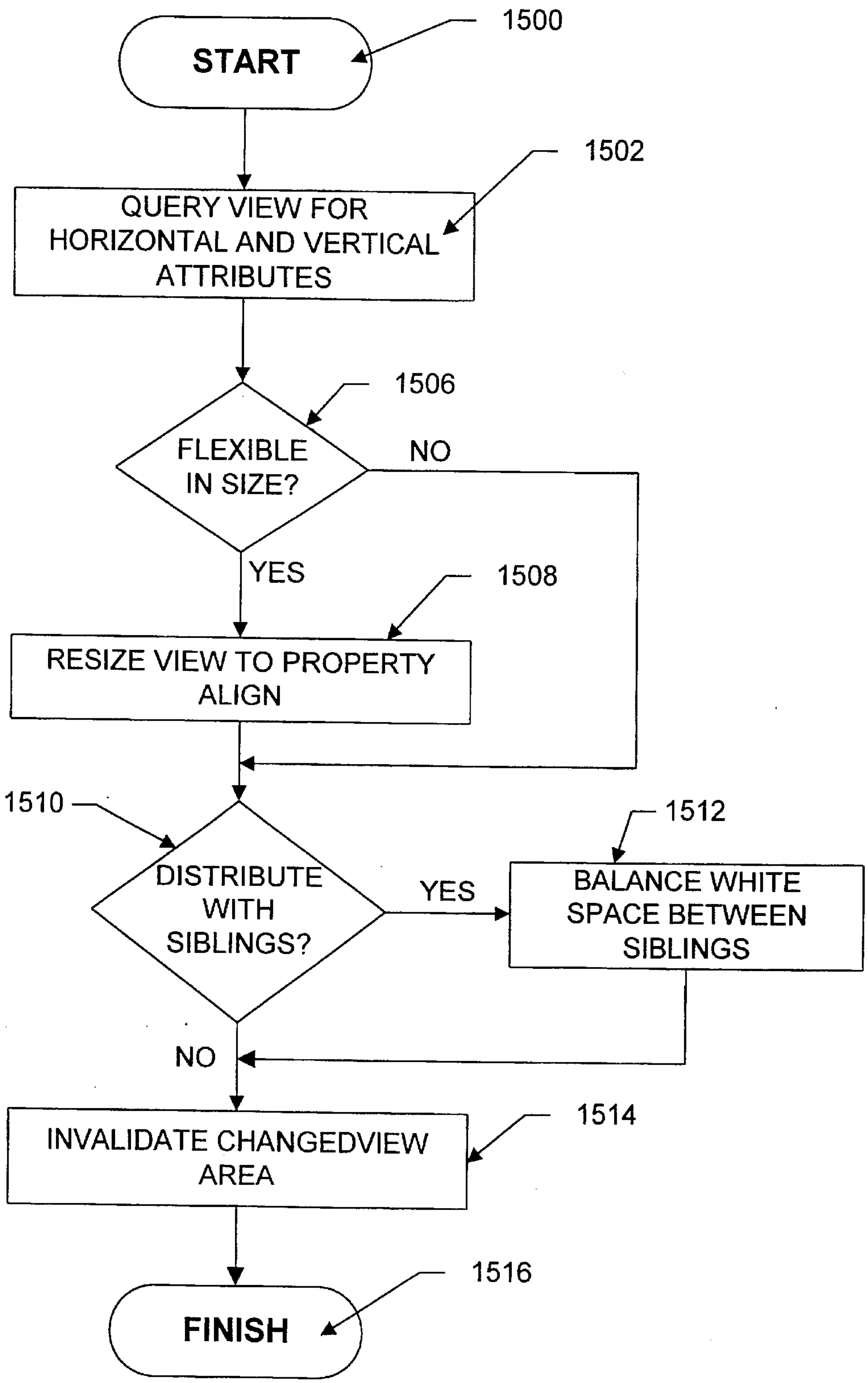
FIG. 15 is an illustrative flow chart of the method by which a view is automatically, spatially laid-out by the object-oriented viewing framework.

FIG. 15 is a flow chart of an illustrative routine used by the view system to arrange the views to produce the layout described in FIG. 14. The routine starts in step 1500. The view system queries a layout view in step 1502 for its horizontal and vertical attributes. In step 1506 the view system determines if the view is flexible in size. If it is flexible, the the view may be resized to accomodate its layout wishes, step 1508. If the view is not flexible in size, then it is not resized. Once any resizing is completed, the view may wish to be moved slightly to distribute white space between siblings, step 1510 and 1512. Once layout is completed, any display areas that have been changed are marked as in need of redrawing by the view system and an update request is posted to the background update framework. The routine is completed in step 1516.

Figure 16:
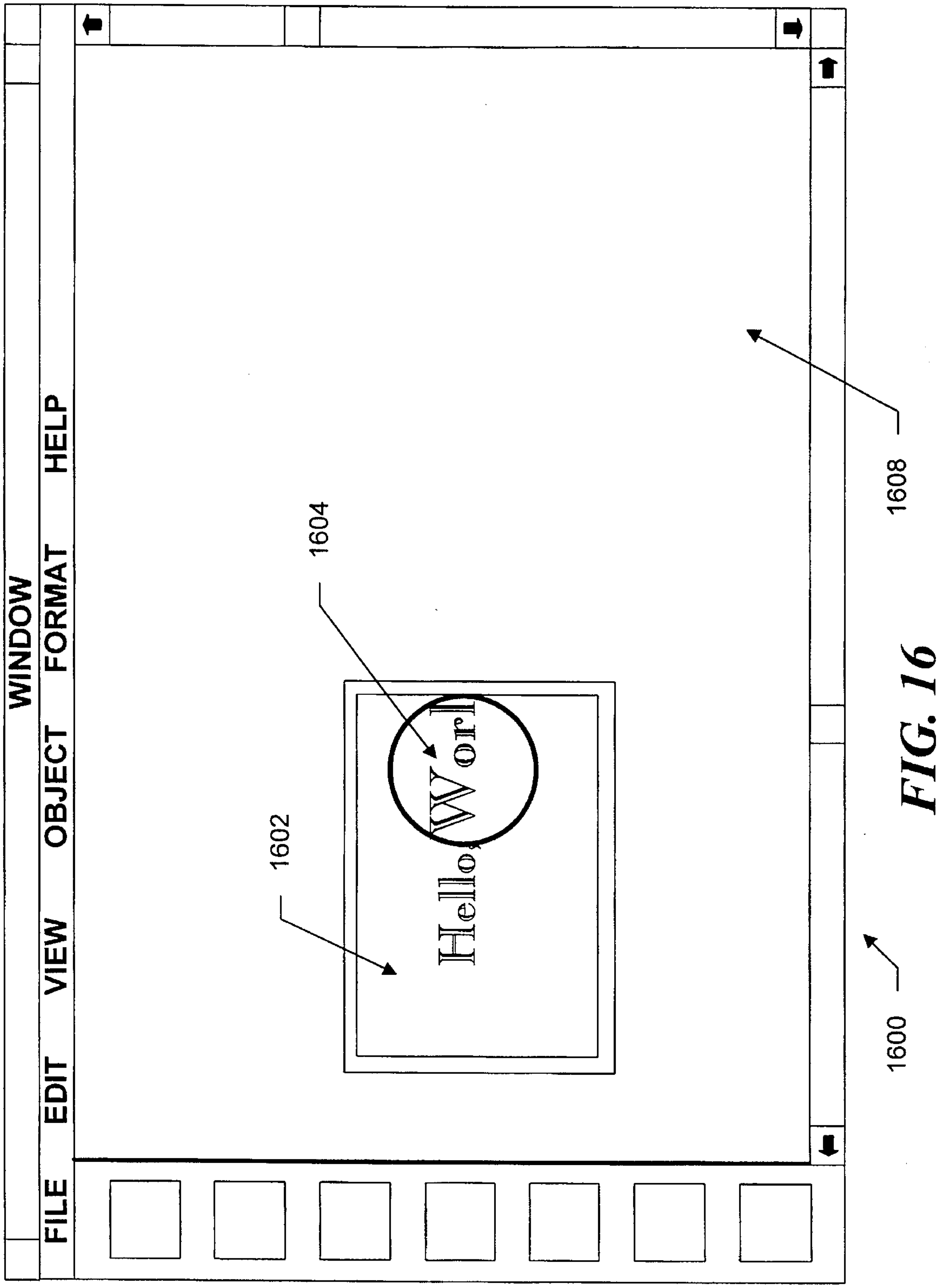
FIG. 16 is a block schematic diagram of the visual effect "Magnifier View Effect" that applies a scaling transformation to the view below it in the view hierarchy as supported by the object-oriented viewing framework.

The schematic diagram in FIG. 16 illustrates a sample transformation used within a view which is used to provide an effect on another view. Window 1600 is similar in operation to the window described in FIG. 6. The content view 1608 is contained within the window 1600. View 1602 is a rectangular view which contains the text "Hello, World". View effect 1604 is a "magnifier" view which displays the view(s) which are "underneath" it magnified by one and a half times (150%). View 1604 could be moved by the user over the content view 1608 to "magnify" other portions of the content view.

Figure 17:
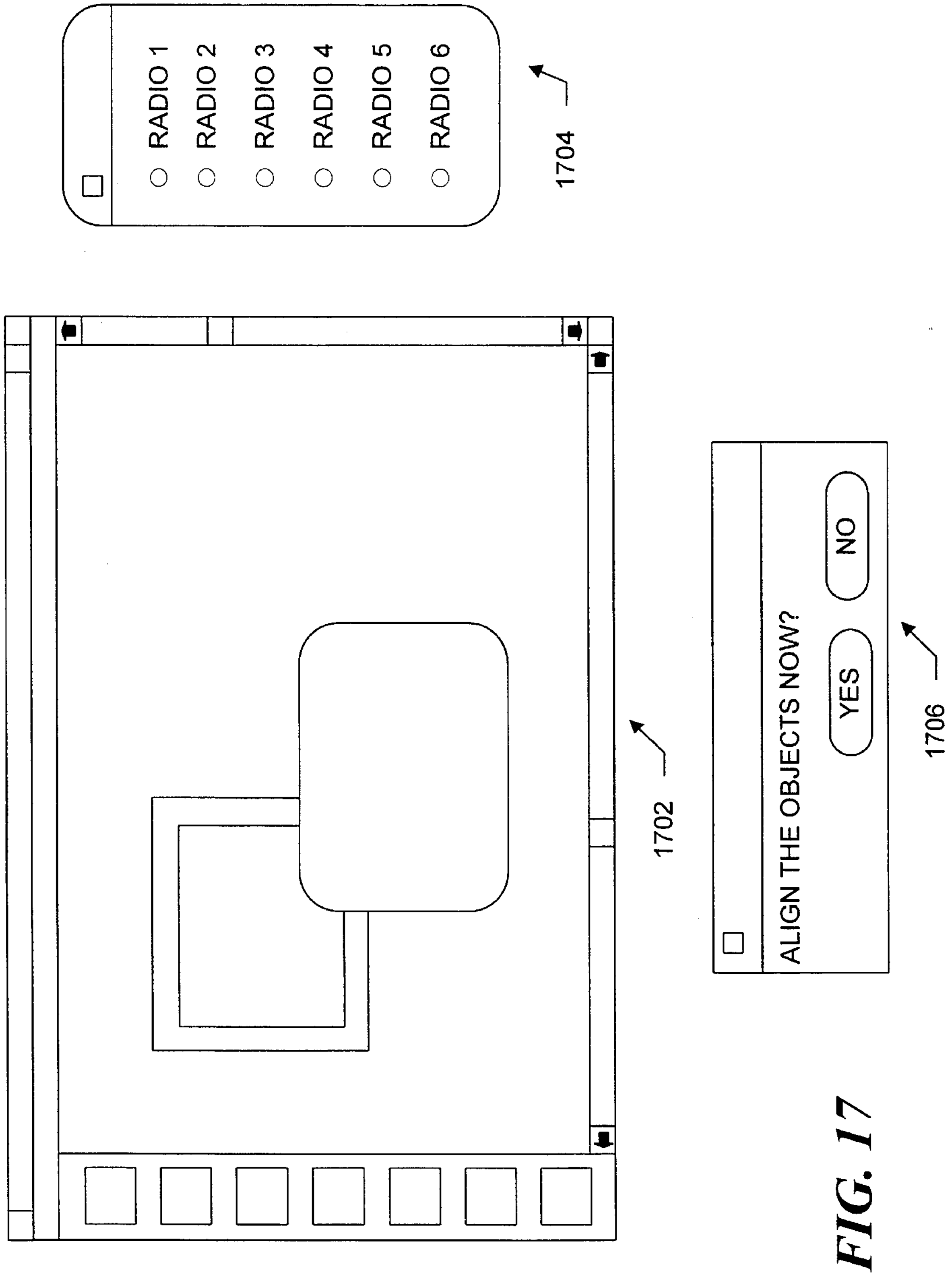
FIG. 17 is a block schematic diagram of the method used by the object-oriented viewing framework to enable grouping of multiple windows to be moved as a single layer.

The schematic diagram in FIG. 17 illustrates the mechanism provided by the viewing framework to "group" separate windows into a single layer, so that they "move" relative to other windows as a single group. For instance, the user moves the mouse over window 1702 and clicks the mouse button to select that window, window 1704 and 1706 will immediately be brought to the front of the display along with window 1702. Selecting any of the three windows 1702, 1704 or 1706 will cause all three windows to be selected and brough to the front of the display.

Figure 18:
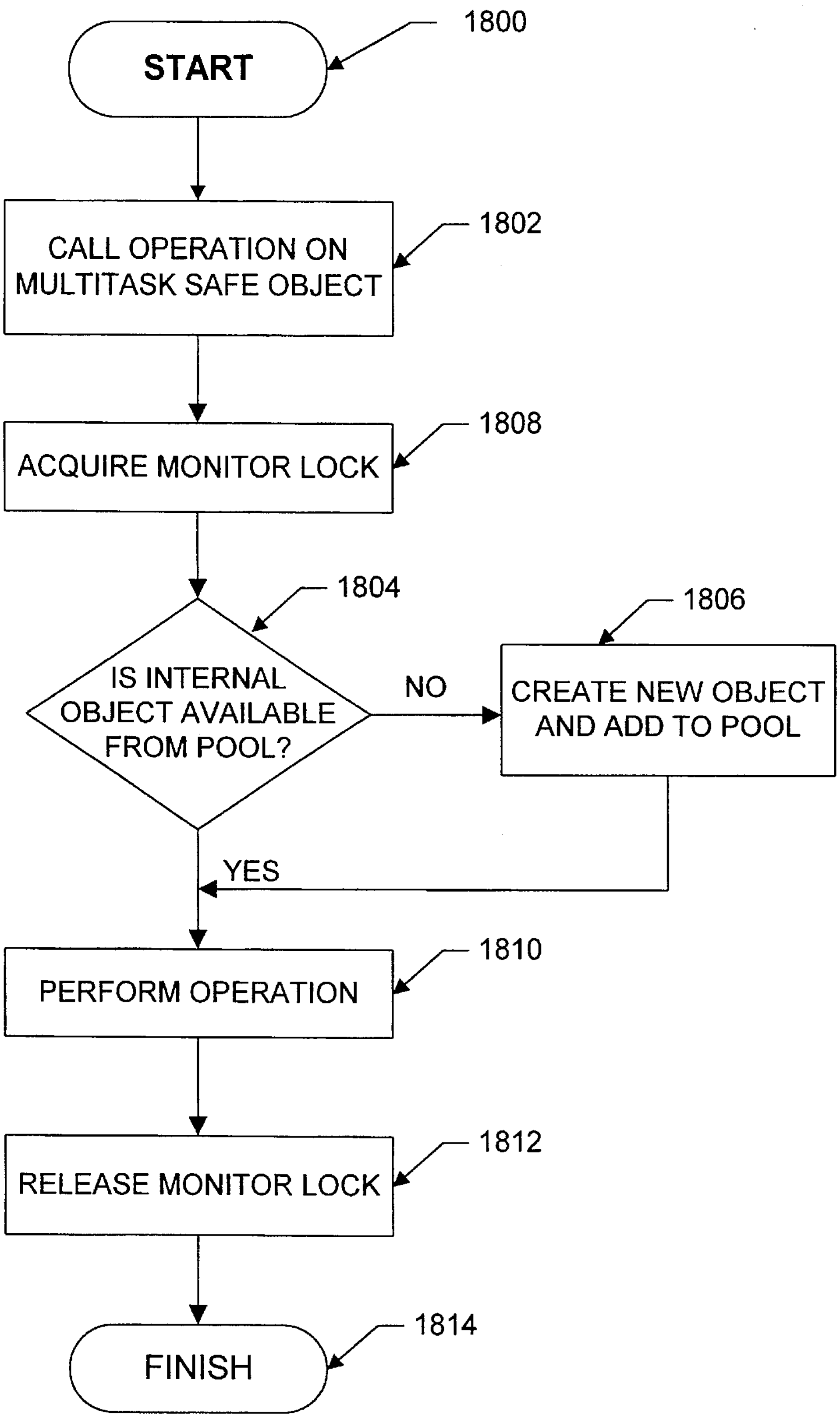
FIG. 18 is an illustrative flow chart of the method by which an application thread makes use of a non multitasking aware object in a multitasking environment as provided by the object-oriented viewing framework

FIG. 18 is a flow chart of an illustrative routine used by the view system to enable to use of non multitask-safe objects by a framework which supports multitasking, as does the view system framework. This mechanism works without modifications to or internal knowledge of the workings of the non multitask-safe object. The routine starts at step 1800. A method call is made on the non multitask-safe object which "caught" and implemented by the multitask-safe object wrapper, step 1802. In step 1808, the monitor, described above, is acquired. In step 1804, the wrapper object checks to see if there are any non multitask-safe objects non currently in use from within an internal "pool" of objects kept by the wrapper. If no objects are currently available, one is construted, step 1806 (another possible implementation might be to block and wait for another object in the pool to become available). Once an available object is obtained, the desired operation is completed using the non multitask-safe object, as presented in step 1810. When the operation is completed, the internal monitor is released, step 1812 and the routine is completed, step 1814.

Figure 19:
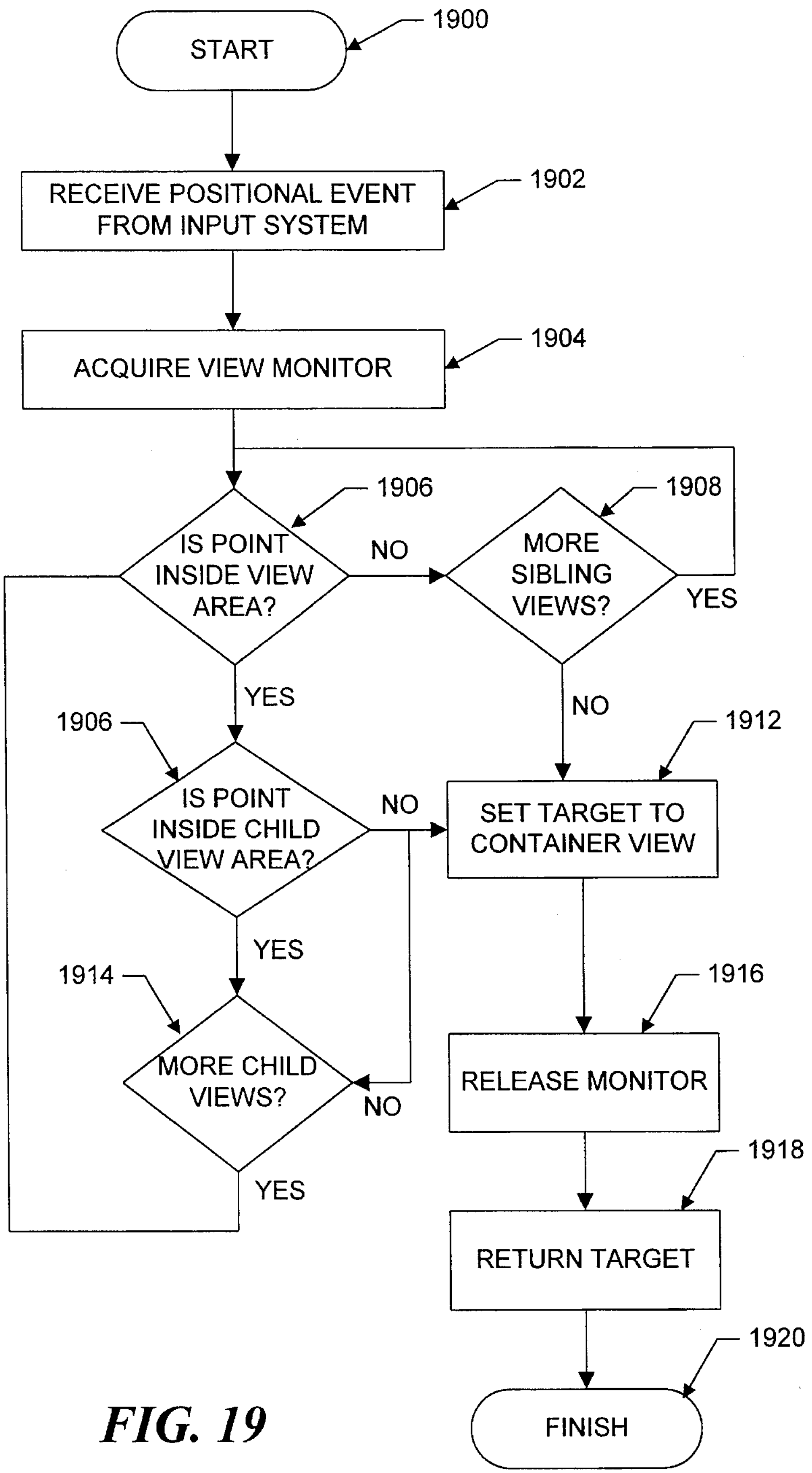
FIG. 19 is an illustrative flow chart of the method by which an application thread receives a positional event via the input system and the object-oriented viewing framework.

FIG. 19 is a flow chart of an illustrative routine used by the view system to interact with the input system and distribute a positional event to its destination view object. The routine starts at step 1900. In step 1902, a positional event is handed to the view system from the input system which received the event from some device that generates positional events, for instance a standard mouse device. The view monitor lock is acquired in step 1904. The view system then makes use of the view hierarchy to determine in which view the point is contained. The view system checks to make sure the point is within the "first" (root) view, step 1906. The operating system would not have passed the positional event to this window if the point was not within the window's bounds, so for the root view case, the test should always return true. (If for some reason it returns false, then there may be a "bug" in some portion of the operating system.) Once it is determined that the positional event is within the root view, the view system determines if the point is contained within a child view of the root view, step 1910. If the point is not within a child view, then the "target" for the positional event is the current view. If the point is contained within a child view, then the view system determines which child view, step 1910 and 1914 and continues recursively until the correct, front-most view which contains the positional event has been found (back to 1906 etc.) Once the target has been found, the view monitor is released, step 1916, and the computed target is returned to the input system, step 1918 which will handle all further processing of the event. The routine is completed in step 1920.

Figure 20A:
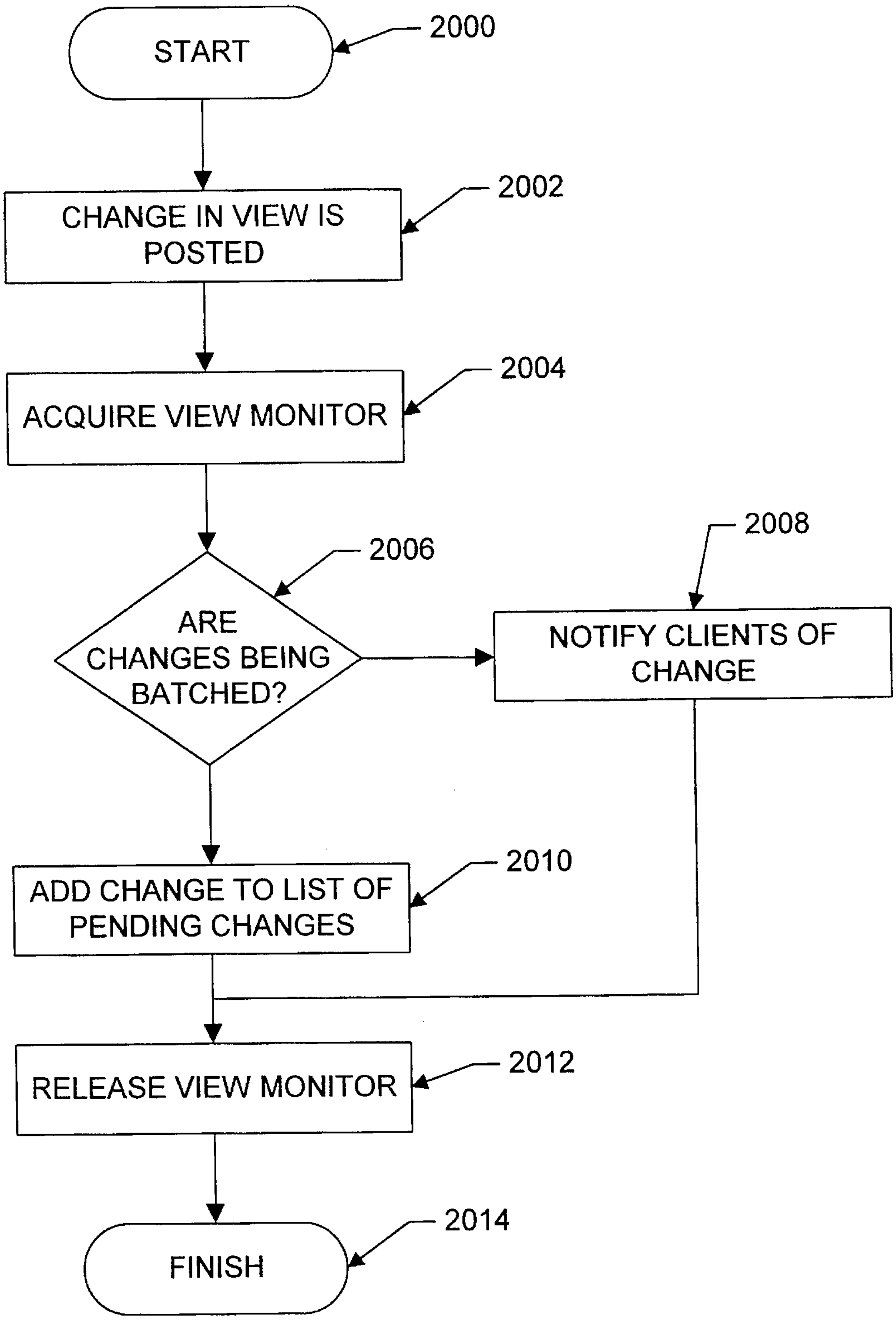
FIGS. 20A and 20B is an illustrative flow chart of the method by which an application thread receives changes in the object-oriented viewing framework in a single batch notification.
Figure 20B:
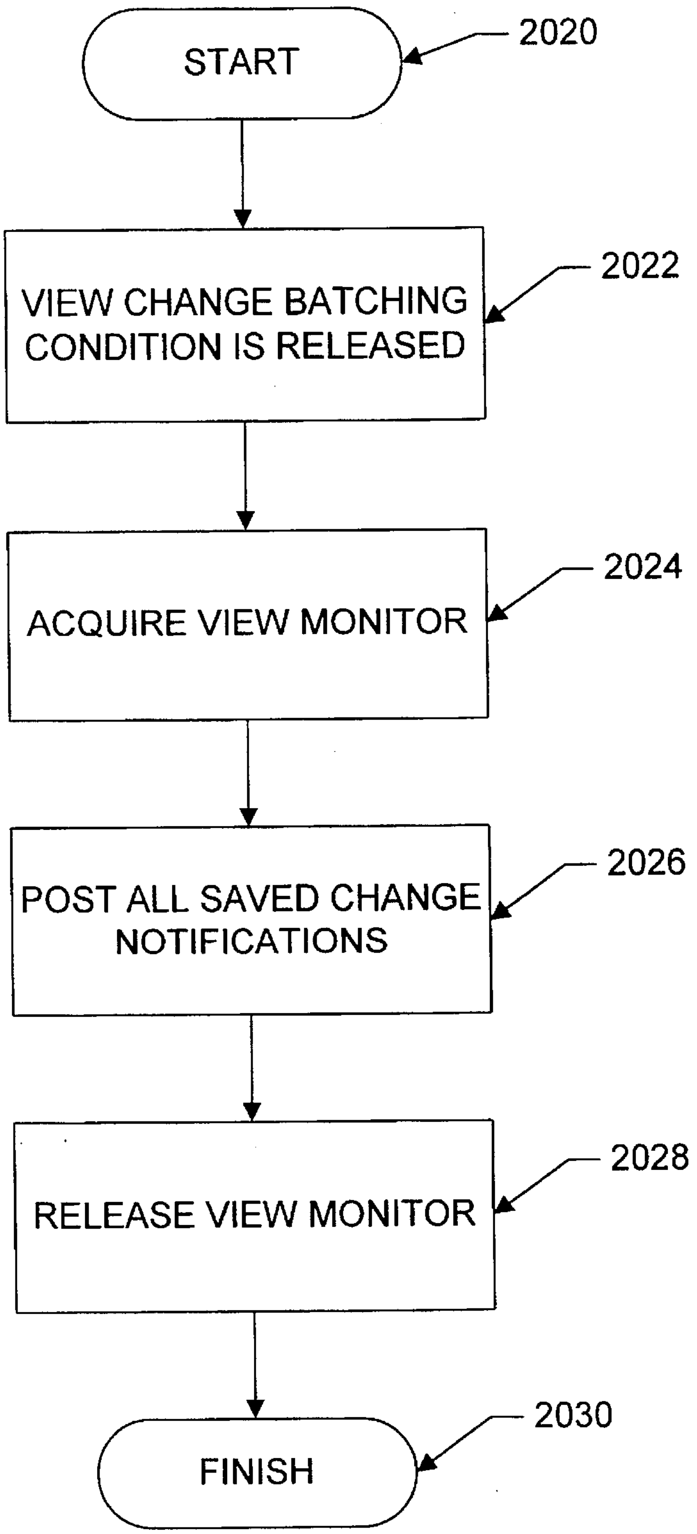

FIGS. 20A and 20B are a flow charts of illustrative routines used by the background updating framework to collect, batch and process changes in the display area of the view system. In FIG. 20A, the routine starts at step 2000. When a change occurs in a view object which is currently installed in the view hierarchy, notification of that change is posted to the view system, step 2002. The view system acquires the view monitor, step 2004 and then checks to see if changes are currently being "batched" for the view system, step 2006. (When the view system is in "batching" mode, any redrawing that may need to be done as a result of view system changes is collected by the view system and saved for later processing by the background updating framework. If batching is not currently in use, then update requests are immediately posted to the background updating framework and processed.) In FIG. 20A, if changes are being batched, then the change is notification is added to the list of changes being saved for later dispatch, step 2010. If changes are not currently being batched, then the change notification is immediately posted to any objects which have registered interest in that change, step 2008. Once the change notification has been handled (either saved or distributed), the view monitor is released, step 2012 and the routine is finished, step 2014. FIG. 20B illustrates the routine used to process change notifications once batching has been turned off. The routine starts at step 2020. In step 2022, the batching condition is changed to allow all pending change notifications to be posted. The view system acquires the view monitor, step 2024, posts all the saved change notifications, step 2026 and then releases the view monitor, step 2028. The routine is completed at step 2030.

Figure 21A:
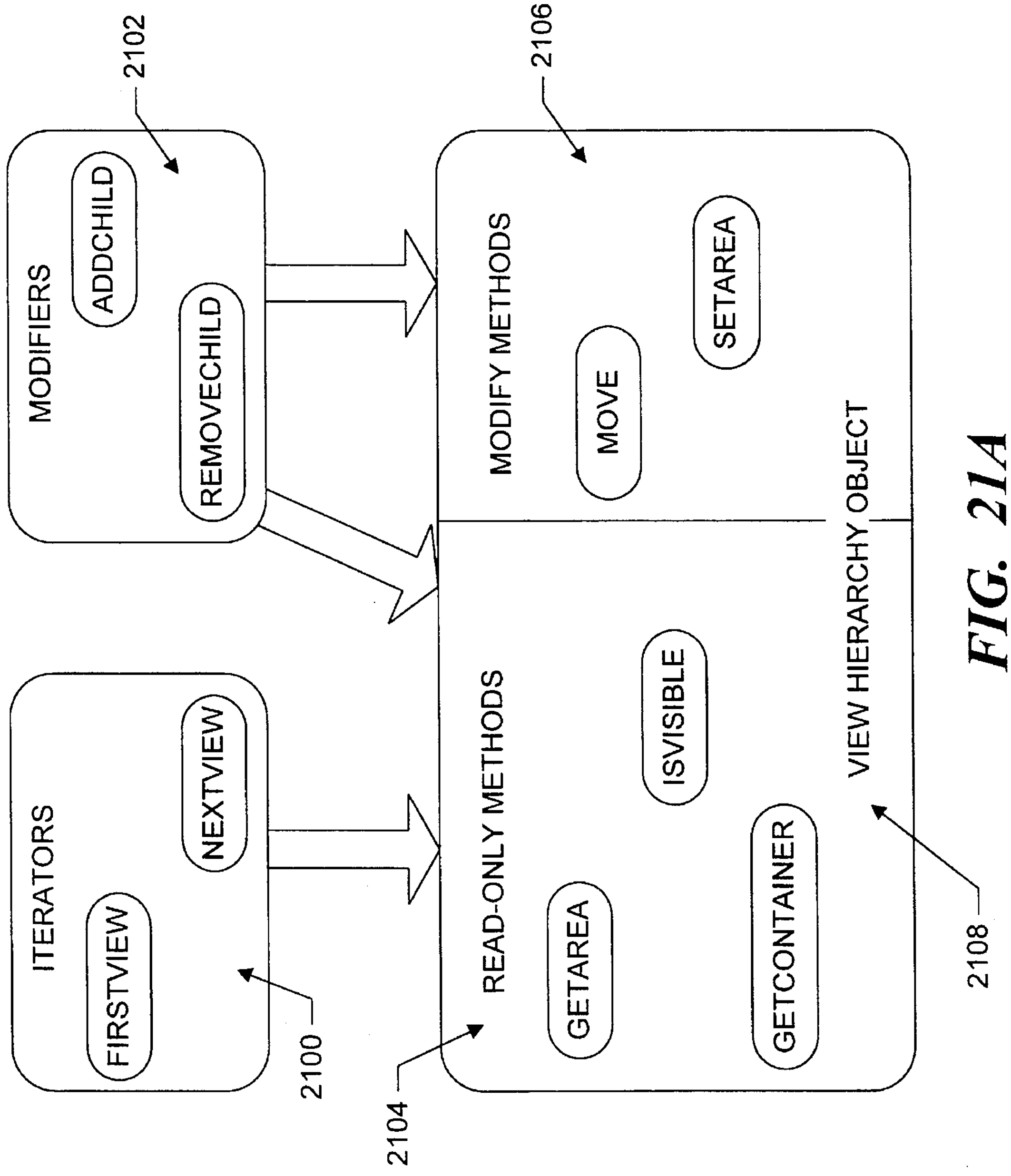
FIGS. 21A and 21B is a block schematic diagram of the method used by the object-oriented viewing framework to support read-only and read-write operations on the hierarchy and view objects.
Figure 21B:
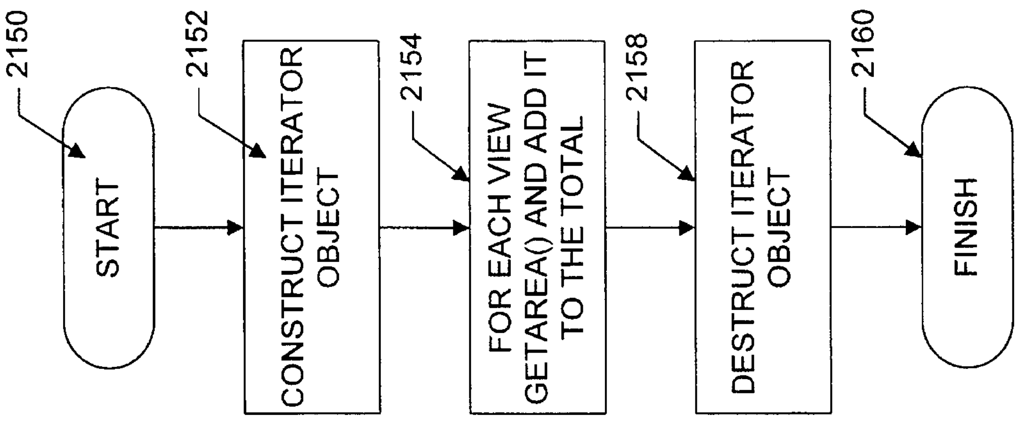

FIG. 21A is a schematic diagram and FIG. 21B is a flow chart of mechanism used by the view system to provide read-only and read-write access to the view hierarchy. FIG. 21A illustrates that iterator objects 2100 have access to only read-only methods 2104 of the view hierarchy 2108. Modifier objects 2102 have access to both read-only methods 2104 of the view hierarchy object 2108 as well as read-write methods 2106 (methods which may modify the hierarchy) of the view hierarchy object 2108. FIG. 21B demonstrates the steps performed in a sample operation of a iterator object (which is being used to compute the total area of all the views child views). The routine starts in step 2150. The view object constructs an iterator object in step 2152. Using the iterator object the view gets the area for each of its direct child views and adds it to the total area, step 2154. Once this operation is complete, the iterator is destructed, step 2158 and the routine is completed, step 2160. No monitors (or semaphores) are needed due to the fact that the iterator (and modifier) objects acquire and release the necessary monitor from within their internal implementation.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A system for displaying a plurality of views in which one view may partially obscure another view leaving a non-obscured, visible area of the another view, each of the plurality of views having an identifier, the system comprising:

(a) a display;

(b) a screen buffer for storing screen information;

(c) display adapter means for directly obtaining the screen information from the screen buffer and for displaying the screen information on the display;

(d) a processor and an attached memory, holding application programs;

(e) hierarchy object means having a data hierarchy structure for defining a frontmost display level to a rearmost display level of views and means responsive to a user request to reorder the display hierarchy for reordering data in the data hierarchy structure to change display levels of the views;

(f) grouping means for storing identifiers for a set of the views in the memory to form a group and for inserting the group into the data hierarchy structure so that each of the set of views in the group has the same display level;

(g) view system means, cooperating with the hierarchy object means and responsive to user requests to change a view, for maintaining a visible area definition for each of the views, each visible area definition designating a portion of the screen buffer for holding screen information for a visible area of a corresponding view; and (h) wherein the application programs each comprise means for obtaining a visible area definition from the view system means, and means for directly storing screen information in the screen buffer under the control of the obtained visible area definition.

2. The system as recited in claim 1, wherein the hierarchy object means includes means for creating a layer object, in the memory, for each view and for the group, the layer object for the group storing linkages to views forming the group.

3. The system of claim 1 further comprising a pointing device and means, responsive to the pointing device, for modifying the data in the data hierarchy structure for repositioning the group.

4. A method of displaying a plurality of views in which a set of the plurality of views may be positioned on a display as a group and in which one view may partially obscure another view leaving a non-obscured, visible area of the another view, the method using a processor attached to a memory, a screen buffer for storing screen information, and a display adapter for directly obtaining the screen information from the screen buffer and for displaying the screen information on the display, the method comprising the steps of:

(a) creating a data hierarchy structure in the memory for defining a frontmost display level to a rearmost display level of views and placing a reference to each of the plurality of views in the data hierarchy structure;

(b) storing identifiers for a set of the views in the memory to form a group and for inserting a reference to the group into the data hierarchy structure so that each of the set of views in the group has the same display level;

(c) in response to user requests to change the display appearance of a view and the group, creating and maintaining a visible area definition for each of the views, each visible area definition designating a portion of the screen buffer for holding screen information for a visible area of a corresponding view;

(d) each application program obtaining a visible area definition maintained in step (c); and (e) each application program directly storing screen information in the screen buffer under the control of the visible area definition obtained in step (d).

5. The method as recited in claim 4, wherein the method further includes the steps of (f) creating a layer object, in the memory, for each view and for the group, the layer object for the group storing linkages to the views forming the group.

6. The apparatus as recited in claim 5, including event detection means in the layer object for recognizing changes in the one or more windows.

7. The method of claim 4 wherein the method further uses a pointing device that issues re-positioning events in response to user actions and further includes the step of:

(g) modifying the data in the data hierarchy structure to reposition the group in response to re-positioning events by the pointing device.

* * * * *